March 31, 1931. W. H. SCHUSSLER 1,799,128
CIGAR BLENDING AND BUNCHING MACHINE
Filed Dec. 20, 1926 12 Sheets-Sheet 1
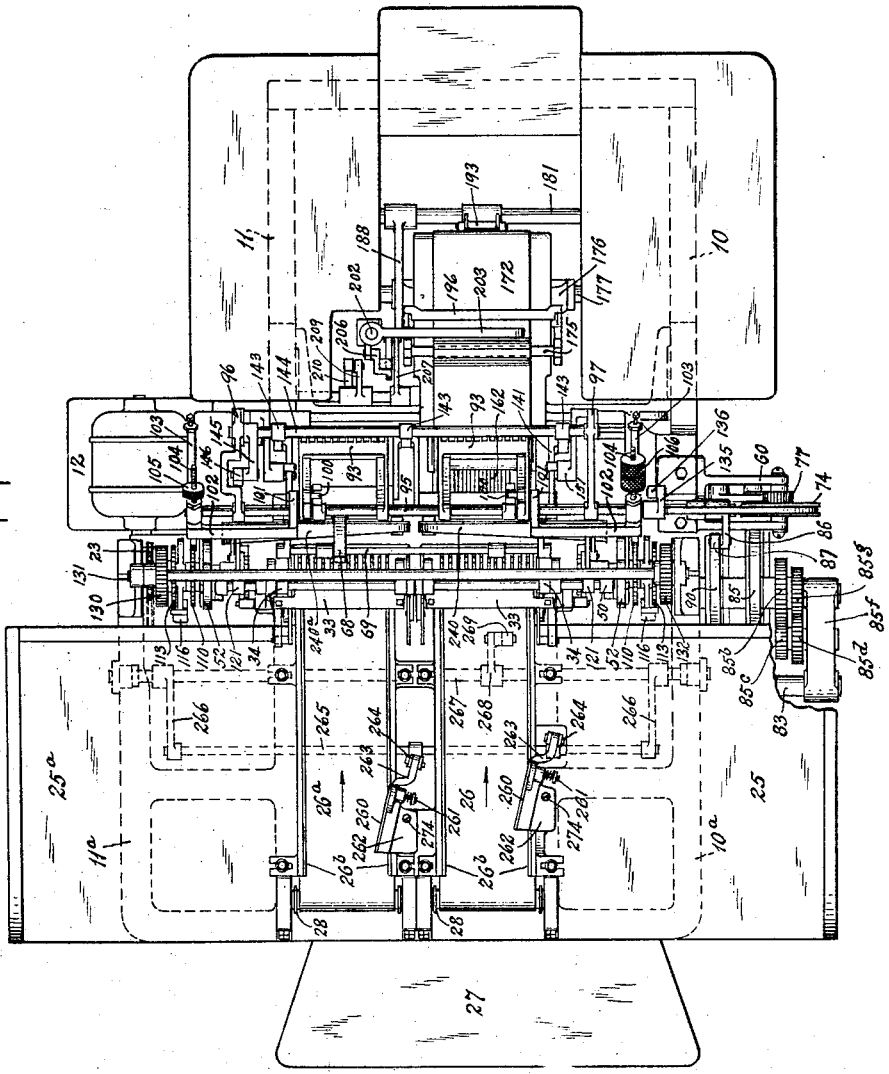
WITNESS
G. V. Rasmussen
INVENTOR
WALTER H. SCHUSSLER
BY
ATTORNEYS

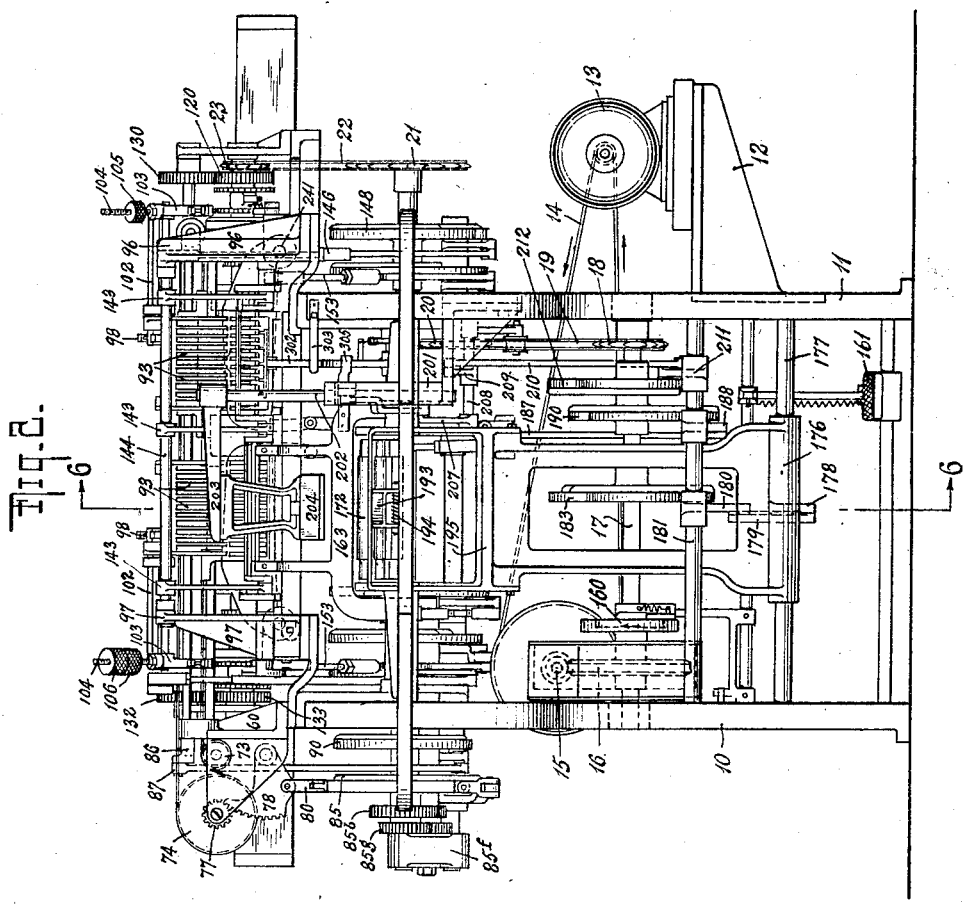

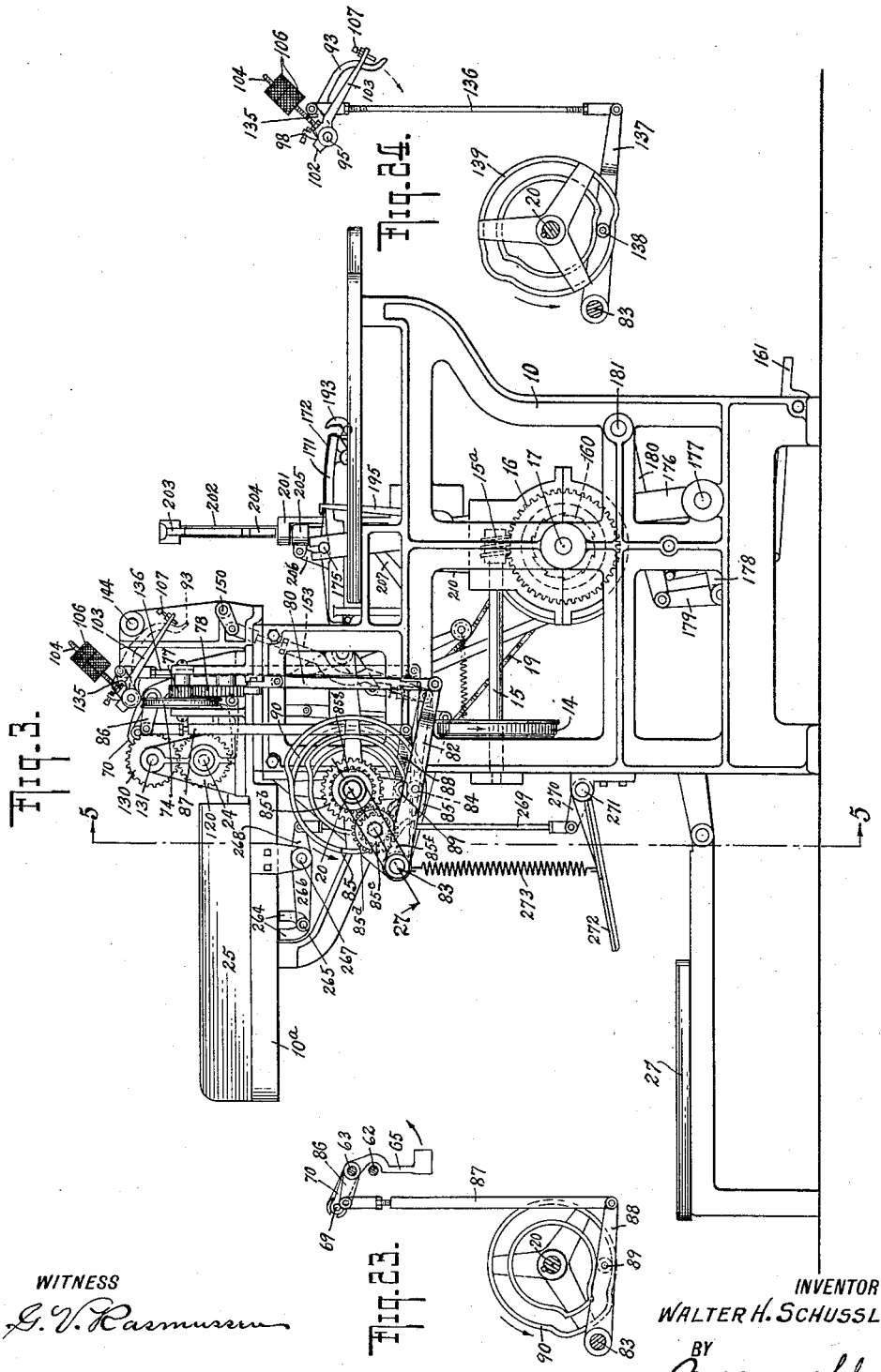

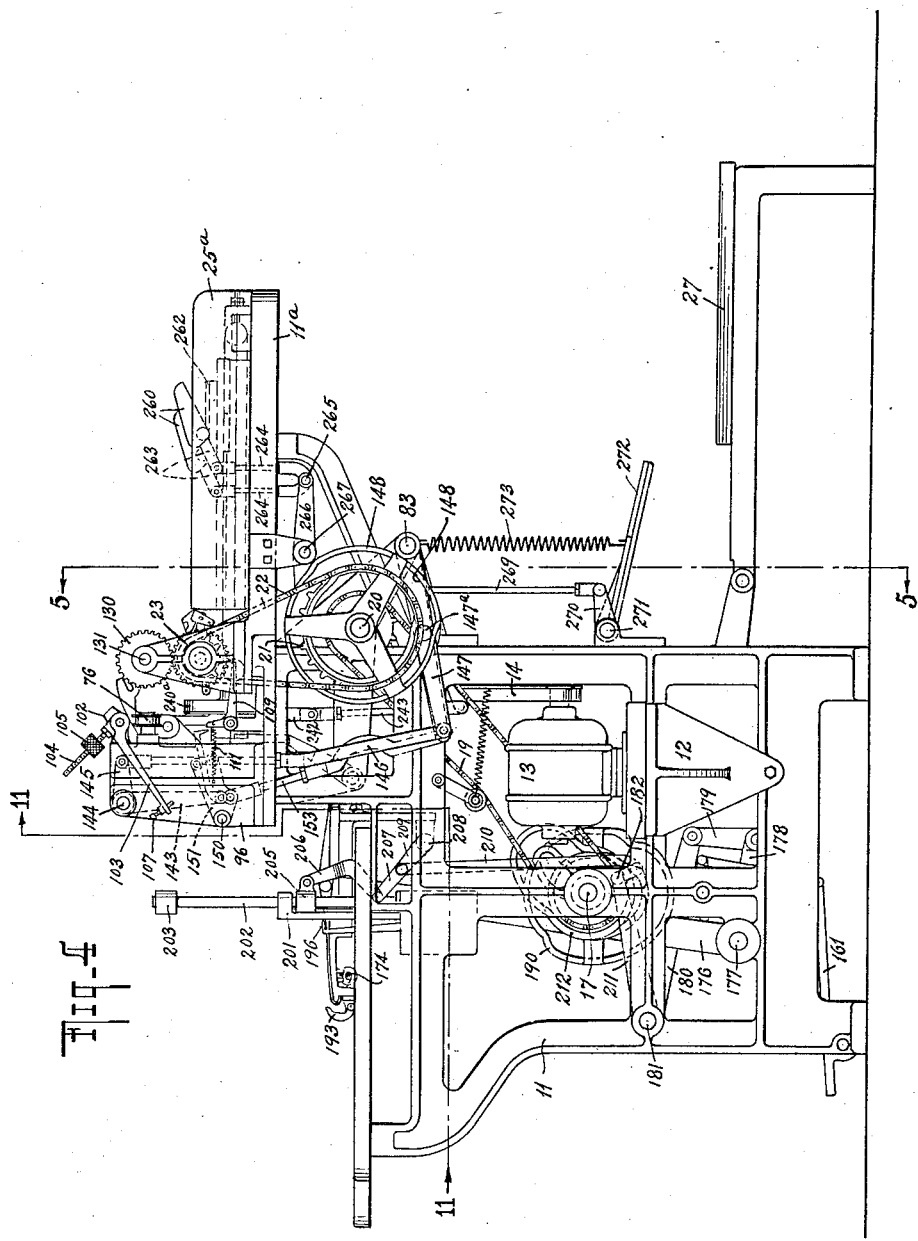

March 31, 1931. W. H. SCHUSSLER 1,799,128
CIGAR BLENDING AND BUNCHING MACHINE
Filed Dec. 20, 1926   12 Sheets-Sheet 5
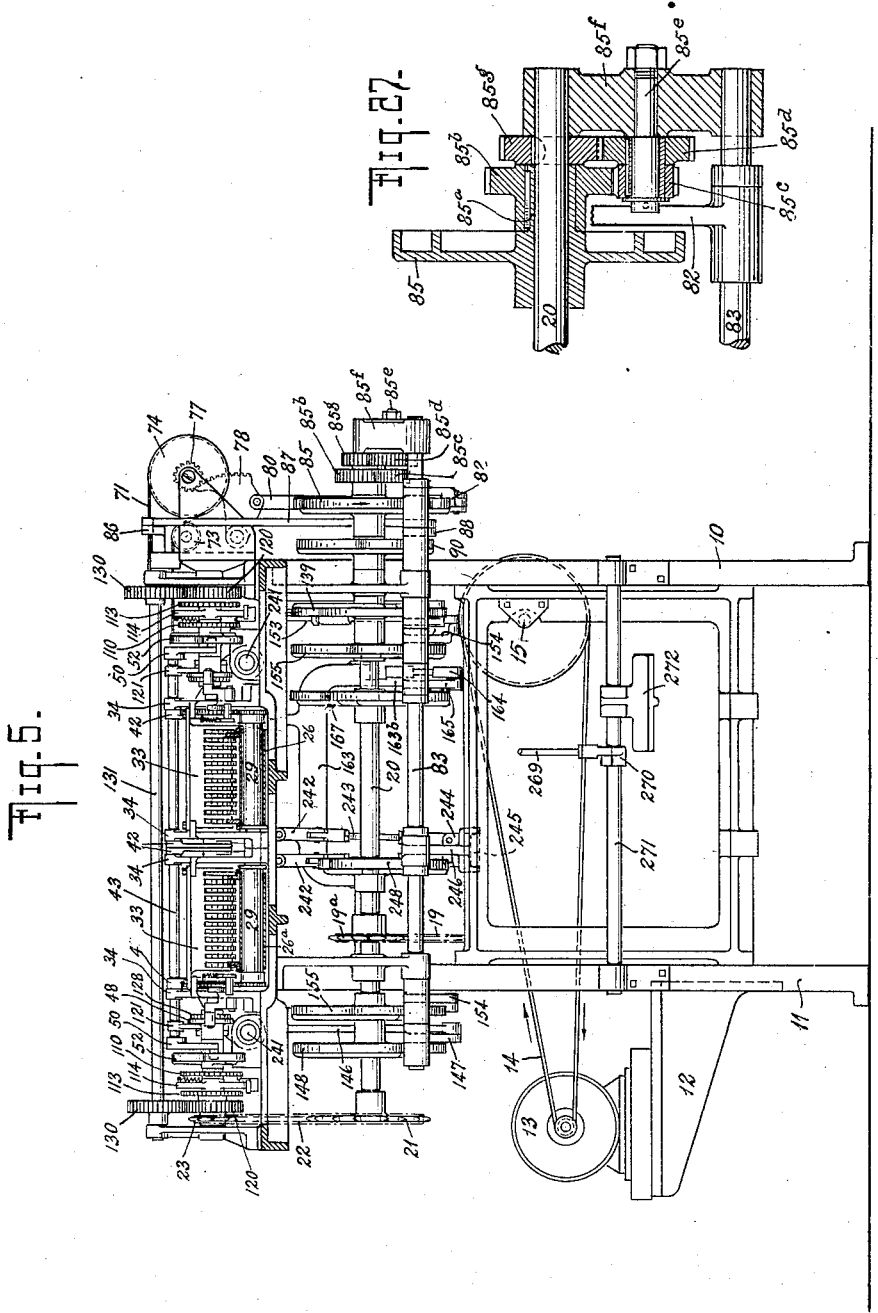
WITNESS
G. V. Rasmussen
INVENTOR
WALTER H. SCHUSSLER
BY
ATTORNEYS

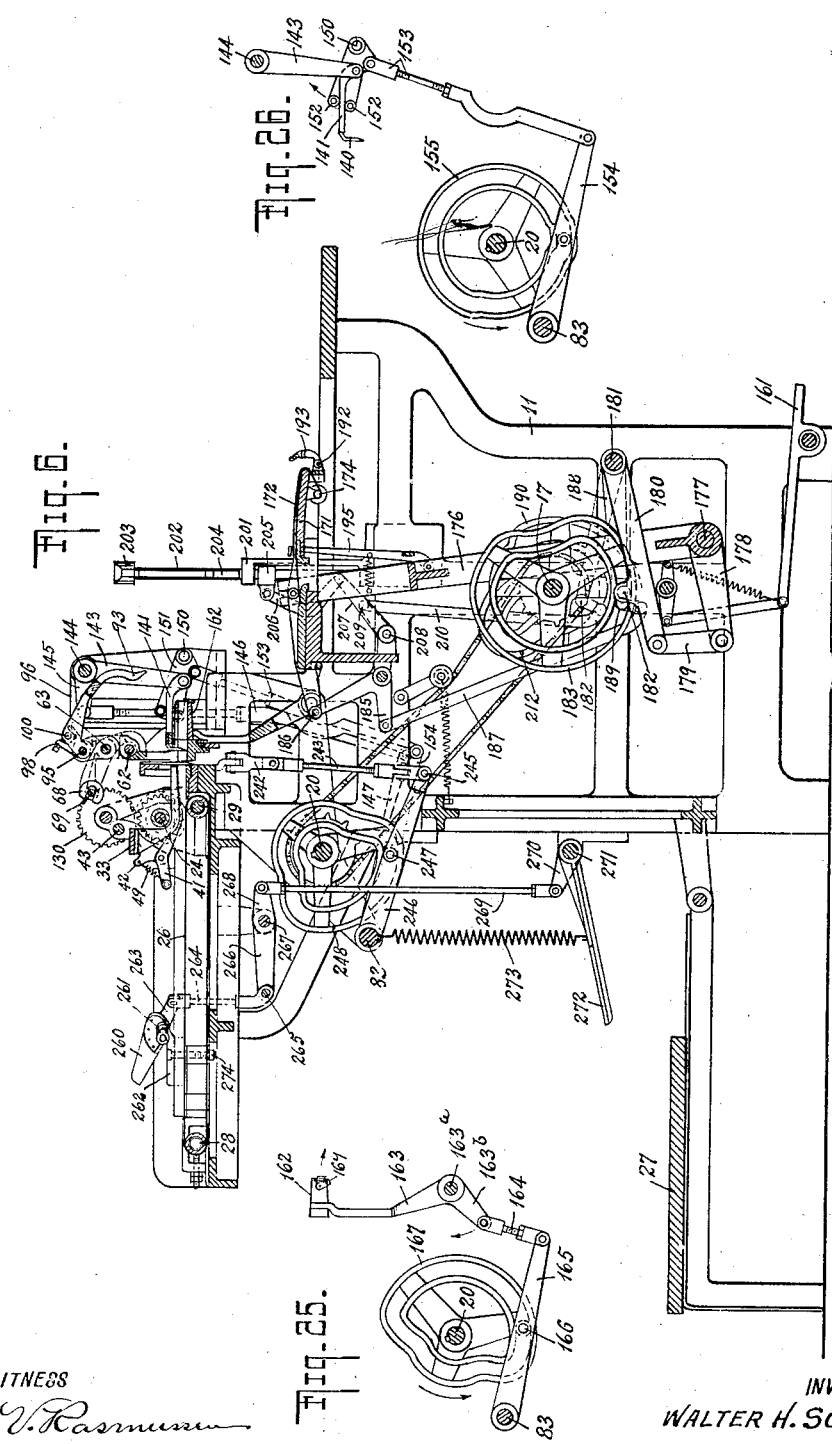

March 31, 1931. W. H. SCHUSSLER 1,799,128
CIGAR BLENDING AND BUNCHING MACHINE
Filed Dec. 20, 1926 12 Sheets-Sheet 7
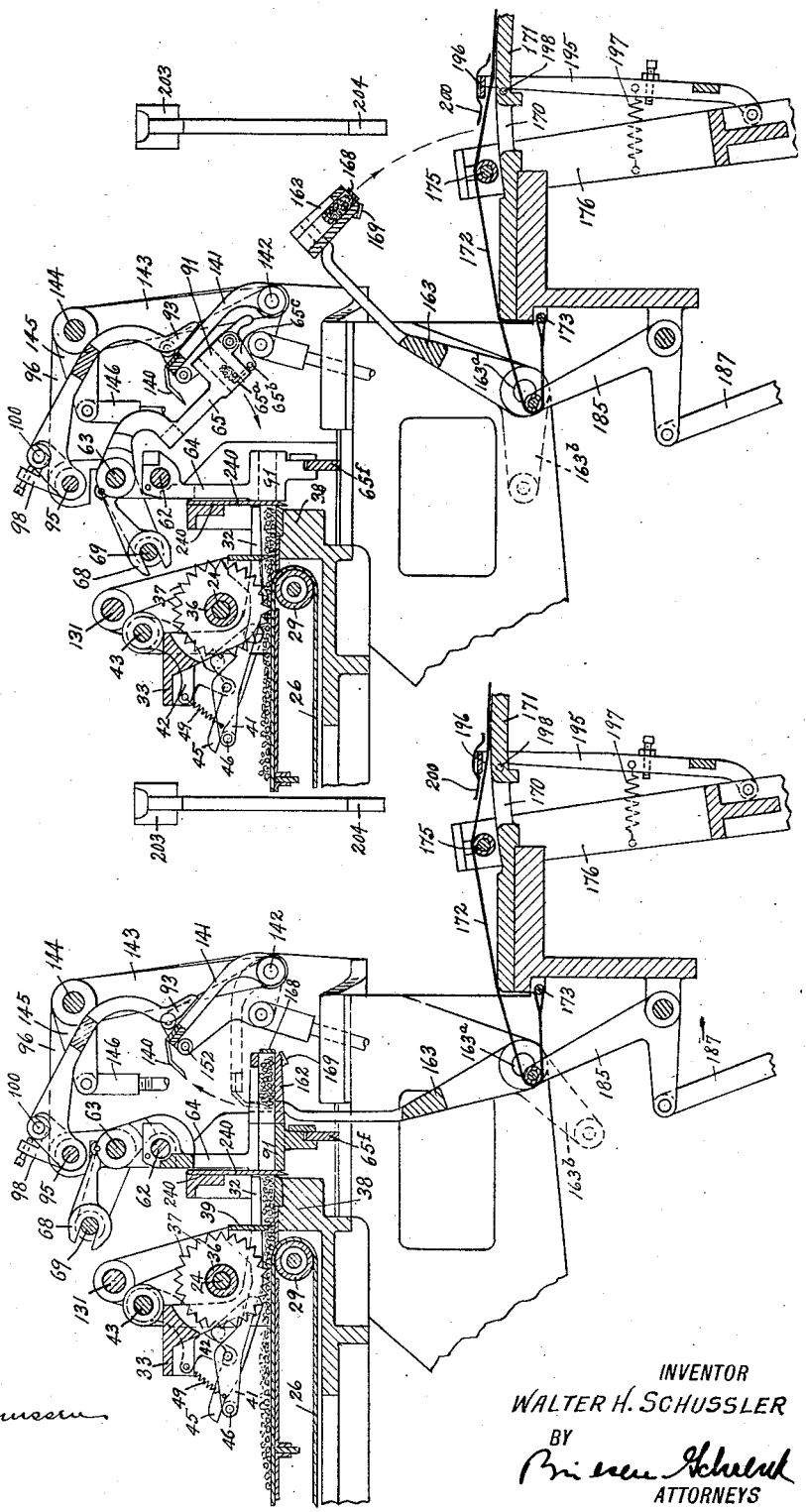
WITNESS
G. V. Rasmussen
INVENTOR
WALTER H. SCHUSSLER
BY
ATTORNEYS

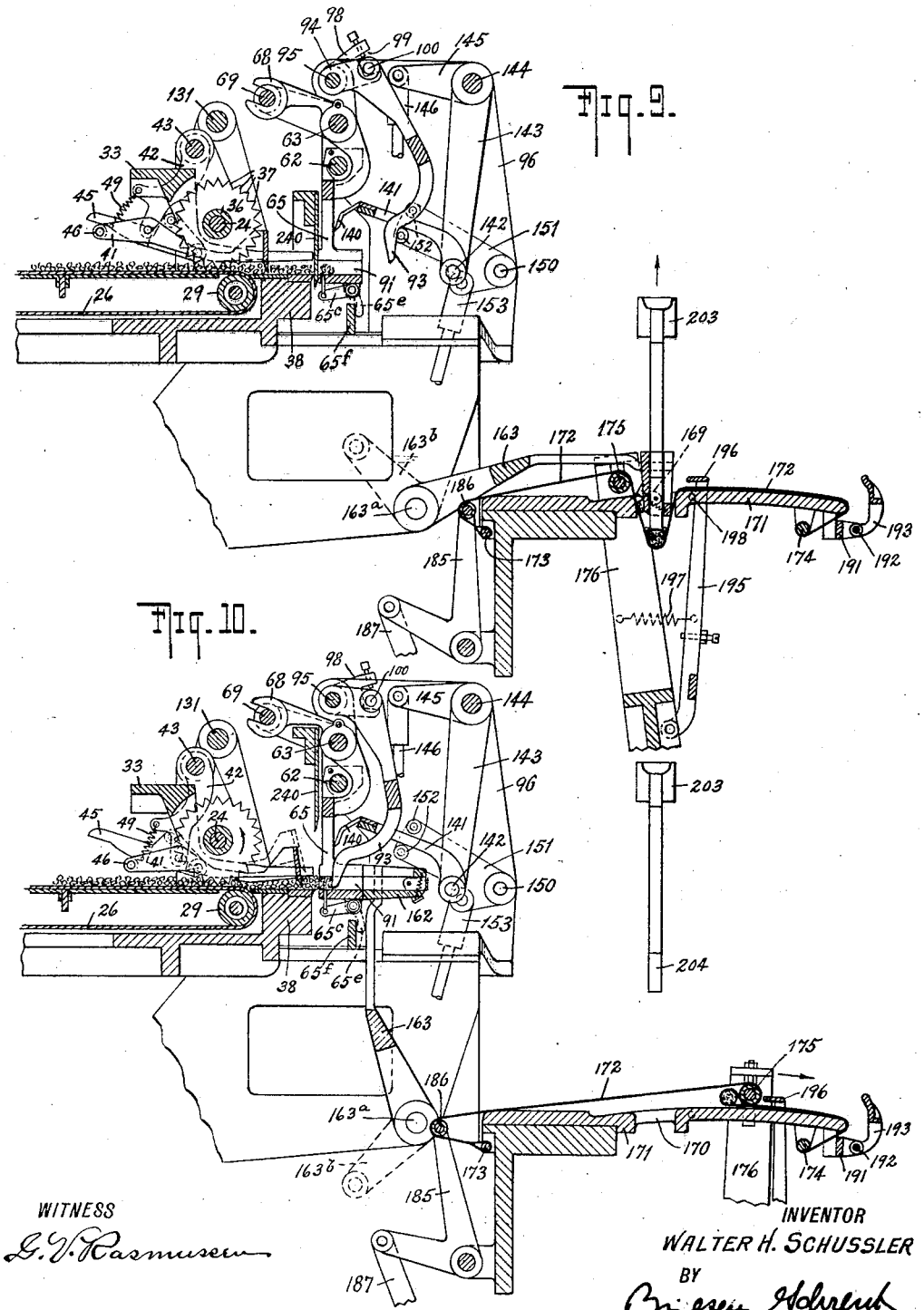

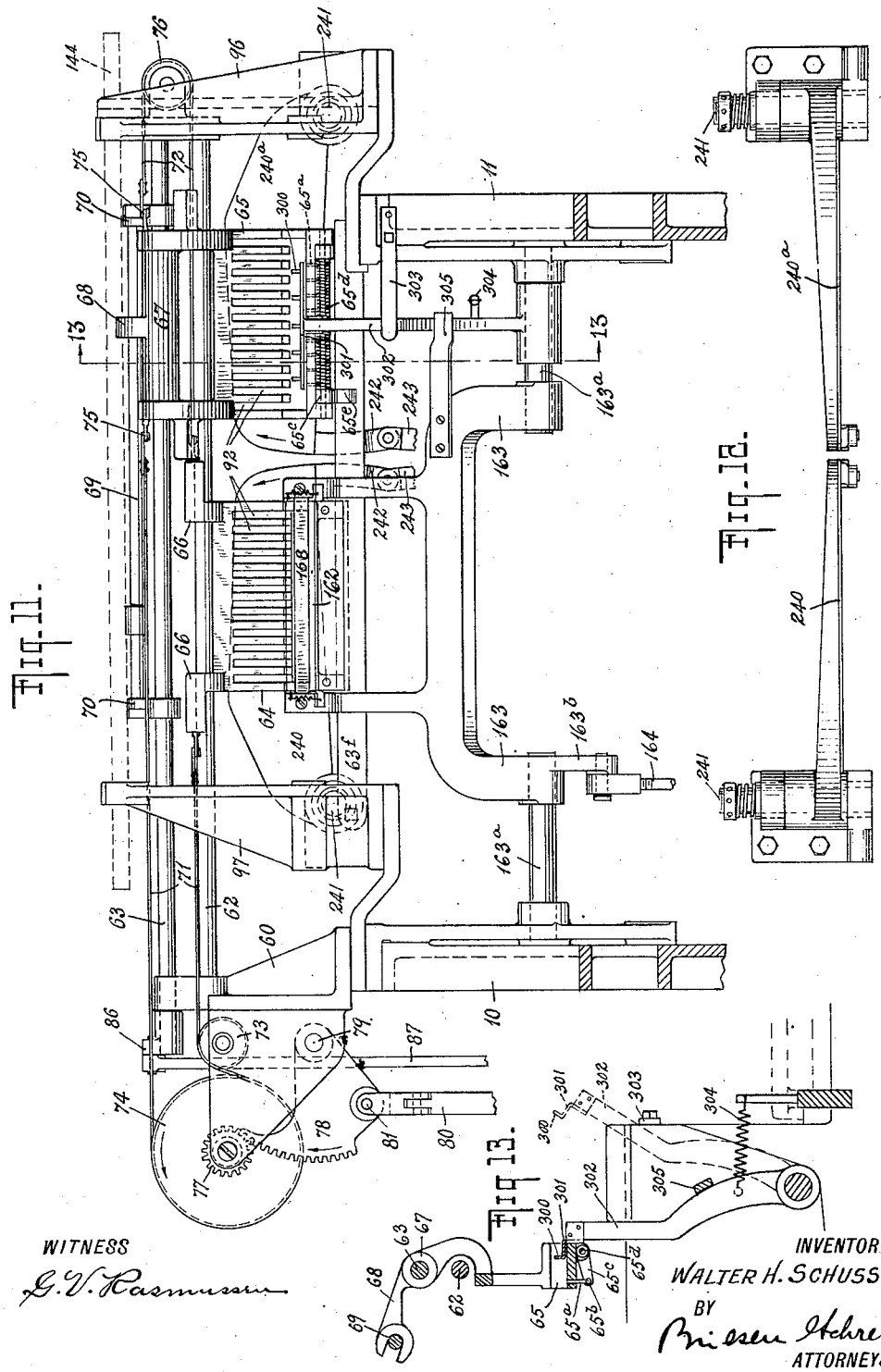

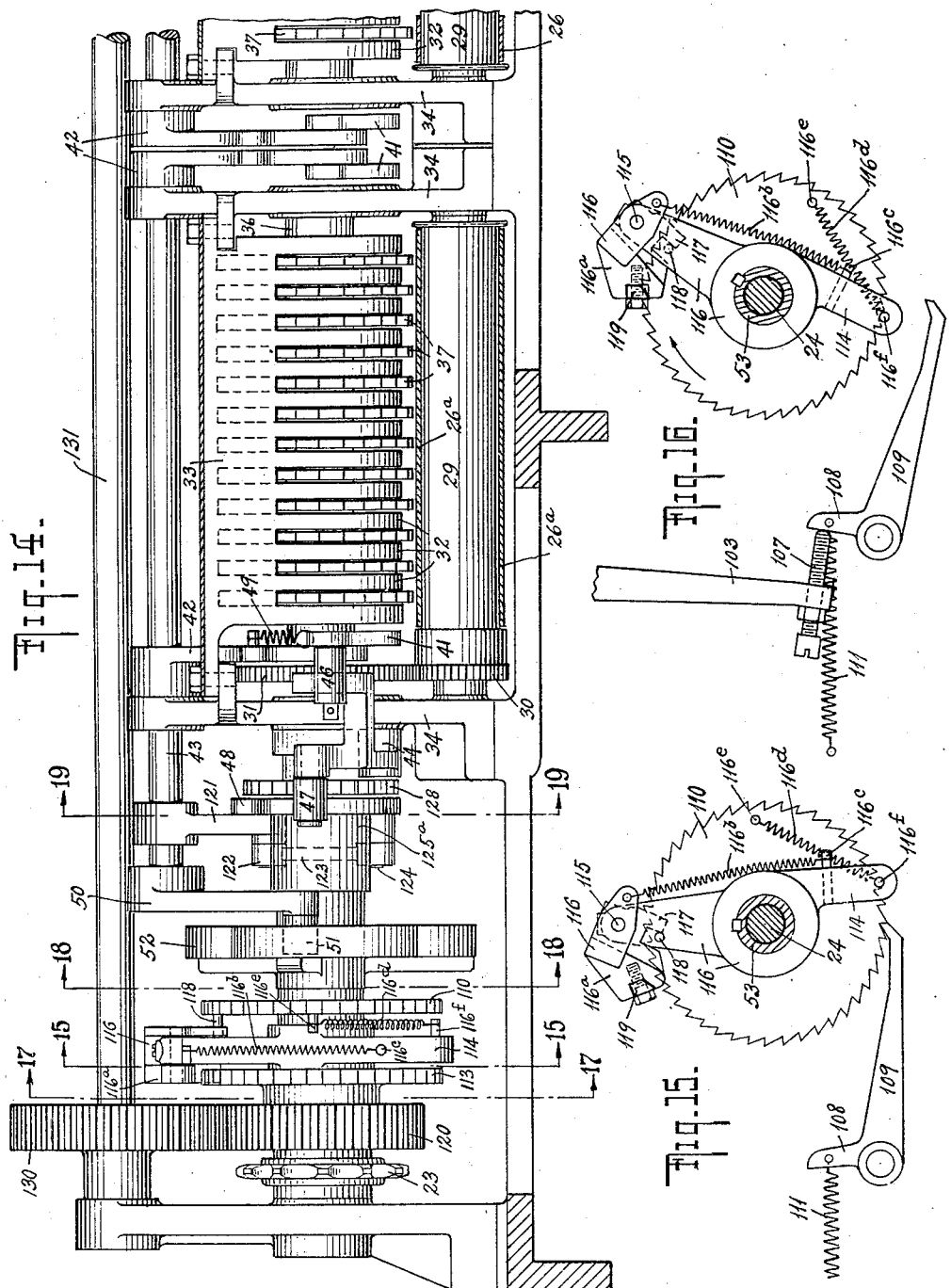

March 31, 1931. W. H. SCHUSSLER 1,799,128
CIGAR BLENDING AND BUNCHING MACHINE
Filed Dec. 20, 1926   12 Sheets-Sheet 11
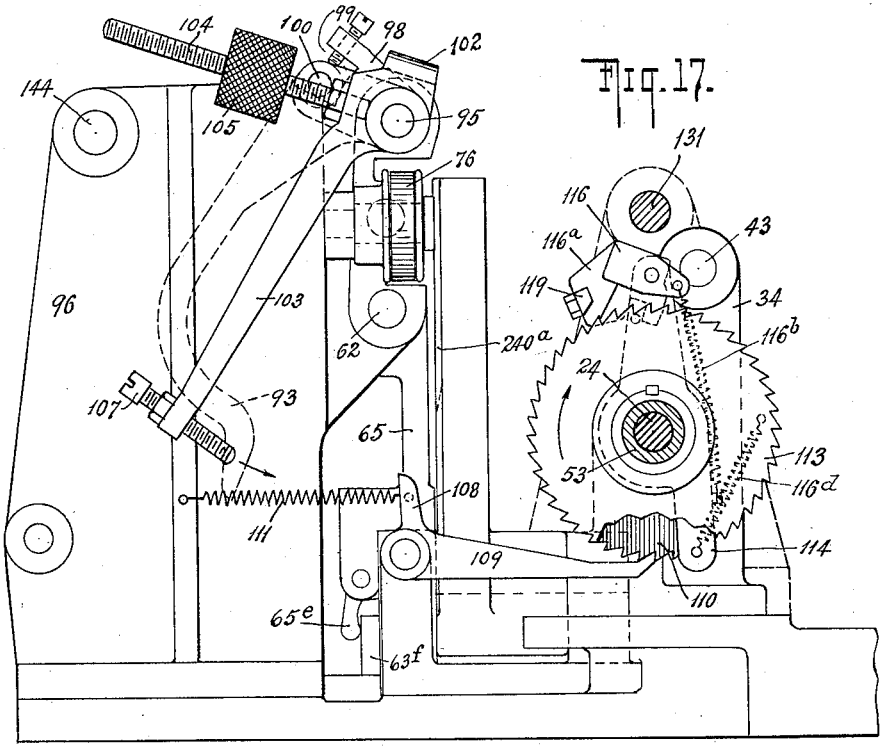
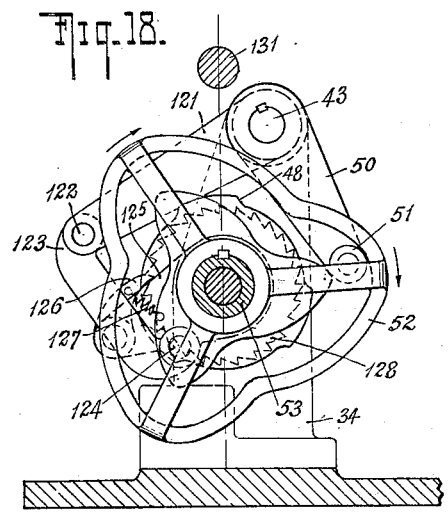
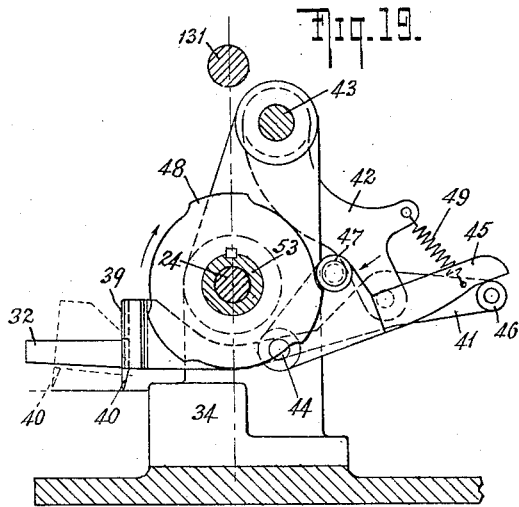
WITNESS
G. V. Rasmussen
INVENTOR
WALTER H. SCHUSSLER
BY
ATTORNEYS

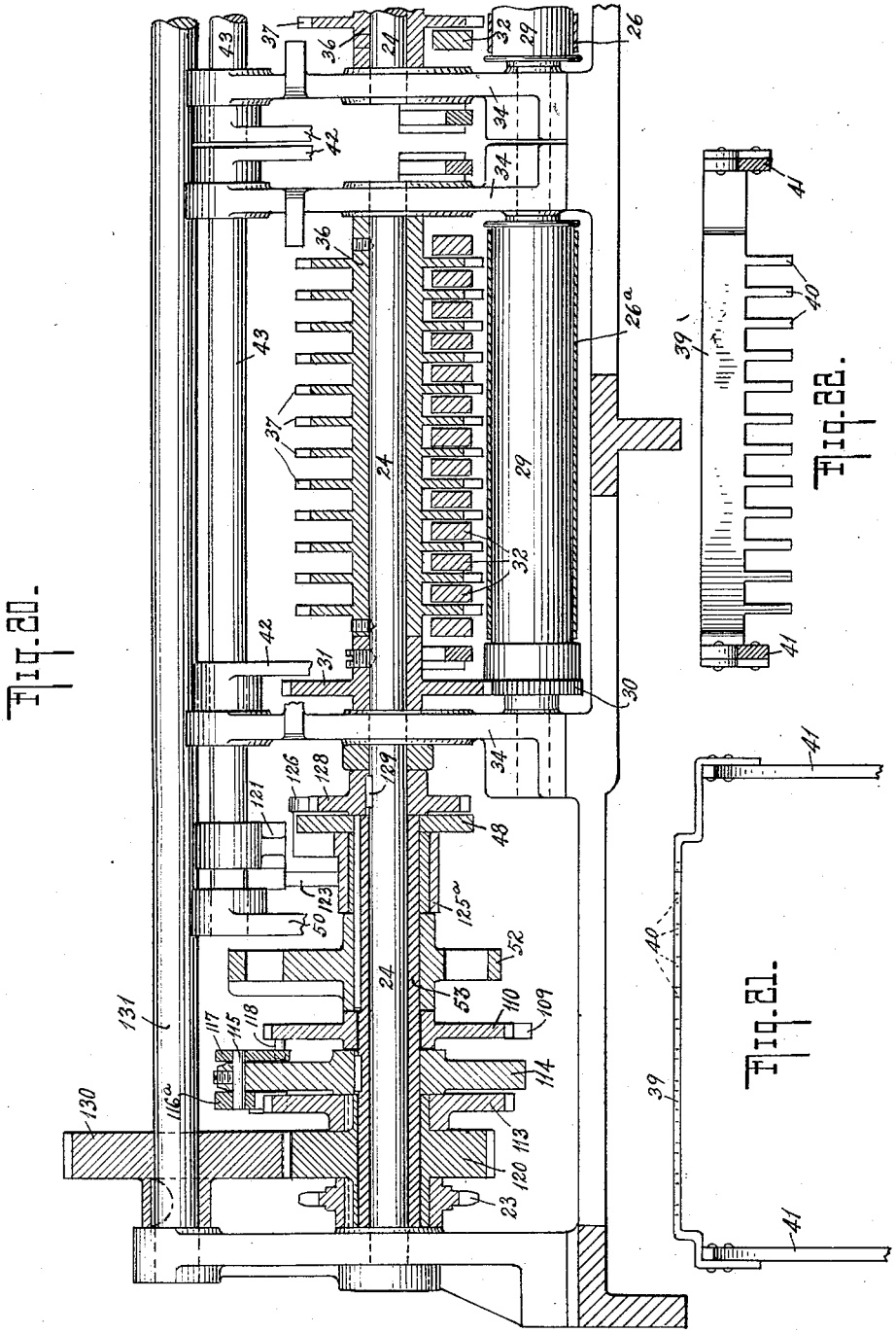

Patented Mar. 31, 1931

1,799,128

UNITED STATES PATENT OFFICE

WALTER H. SCHUSSLER, OF PHILADELPHIA, PENNSYLVANIA, ASSIGNOR TO THE SCHUSSLER TOBACCO MACHINE CO. INC., OF PHILADELPHIA, PENNSYLVANIA, A CORPORATION OF PENNSYLVANIA

CIGAR BLENDING AND BUNCHING MACHINE

Application filed December 20, 1926. Serial No. 155,790.

This invention relates to automatic machines for the manufacture of cigars and particularly to machines for performing the operation known in the trade as bunching. While automatic machines have heretofore been constructed for performing this operation, their use has been limited to the cheaper grades of cigars because of many reasons, among which may be noted: First, the prior machines pack the filler tobacco so tightly, insufficient air passages result; consequently, due to the poor draft, the combustion of cigars made on such machines is imperfect. As the degree of perfection of combustion or as it is termed in the trade, "burn", is the most important factor or test which determines the merits of a cigar, this single objectionable feature of machine-made cigars has been sufficient to preclude the use of the prior art machines for better grade cigars; second: The machines did not produce a cigar of good appearance, that is, one of proper roundness, in which all corners are eliminated; consequently, the machine-made cigars have exhibited marked visible characteristics which distinguished them from the hand-made cigars; third: the use of the machines has been practically limited to the manufacture of straight cigar shapes, as shaped cigars of the "Perfecto" or "Invincible" types could not be made by the machines as heretofore constructed without trimming the fillers to shape thereby producing scrap or short fillers which are objectionable in long filler cigars; and fourth: the prior machines have, as far as I am aware, been limited to the manufacture of cigars in which a single grade or brand of tobacco was used for the filler. Therefore, such machines could not be used for making a blended cigar that is, one in which two different grades of filler tobacco are used.

The principal object of this invention is to provide a new and improved construction for an automatic cigar bunching machine capable of manufacturing cigars having none of the objectionable features, above set forth, of machine-made cigars, which machine can be employed for making shaped, as well as straight cigars which can be used for manufacturing straight or blended filler cigars with equal facility and, if used for blended cigars, capable of proportioning the blend with greater accuracy than can even be secured by the use of hand-made methods, in short, to provide a machine capable of manufacturing machine-made cigars that will be equal, if not superior, to the hand-made product.

The above and other objects will appear more fully from the following more detailed description.

Briefly stated, the machine consists of a pair of intermittently actuated, travelling, endless, feed belts upon which the tobacco which is to comprise the filler of the cigar is placed and is thereby carried forwardly into the machine under a series of pressure plates or fingers, adjacent to which are placed a number of auxiliary feeding devices which, in the form of invention hereinafter to be more fully described, comprise a plurality of star wheels which cooperate with the travelling belts to force the tobacco under the retaining plates. After passing under the retaining plates, the tobacco travels into the zone of movement of a first set of intermittently actuated rakes which engage the tobacco after it leaves the travelling belts and pushes it forwardly into a pair of boxes normally arranged one at each end of, and in alignment with, each of the travelling belts. The pair of belts are arranged one on each side of the machine, one of the belts being adapted to receive a brand of tobacco which will hereinafter be referred to as the "main filler" and forming the major part of the filler, and the other belt receiving another brand of tobacco, hereinafter called the "blend filler", which is blended or mixed with the main filler. The pair of boxes above referred to, which will hereinafter be termed the "blending boxes", is connected with a mechanism for intermittently moving the boxes transversely across the machine into their normal positions of alignment with the travelling feed belts, where said boxes are simultaneously charged, each with a predetermined amount of main and blend filler. After a box, at a certain stage in the cycle of operations of the machine, has been charged with a predetermined amount of the blend filler, said box is moved transversely across the machine into alignment with the travelling belt which feeds the main filler, and the box which was formerly in alignment with the said belt is simultaneously moved across into alignment with the travelling belt for the blend filler. While the box containing the blend filler is in alignment with the main filler belt, there is pushed into it by the action of the first set of rakes above referred to, a charge of main filler. This charge is then cut off and separated and a second set of rakes then engages the tobacco within the box so charged with blend and main filler and moves it into a transfer box which then transfers the charge of blend and main filler to a belt or apron, a plunger being provided for ejecting the filler onto said apron in proper timed relationship. A leaf of tobacco, which forms the binder or inner wrapper, is first placed on this apron by the operator before the filler is ejected from the transfer box, and the apron is then automatically actuated to compress and roll the filler within the binder into the desired shape, to form a cigar bunch, which is subsequently wrapped and finished by hand. The machine operates to perform a cycle of operations which consists of the following steps: feeding the tobacco and giving it a preliminary compression during such feeding; delivering a charge of blend filler to a blending box; moving the blending box, with blend filler therein, into the path of the main filler being fed to the machine; completing the entire amount of filler which is to comprise the cigar by mixing with the blend filler a predetermined amount of the main filler; transferring the complete blended filler to the transfer box; actuating the transfer box to bring it into position over the rolling apron; ejecting the charge of blend and main filler onto the rolling apron and rolling the filler into the binder to shape the cigar bunch and give the filler the final compression, as the binder is rolled or wrapped about it.

For convenience and clarity of description the machine will be described under the following sub-headings:

Framework and main driving mechanism.
Tobacco feeding means.
Blending boxes.
Charge regulating device.
Clutch actuating mechanism.
Mechanism for moving charge determining fingers out of blending boxes.
Means for feeding the tobacco through the blending boxes and to the transfer box.
Transfer box.
Rolling apron and associated parts.
Operation.

Referring to the accompanying drawings forming a part hereof, in which I have shown, by way of example, a satisfactory construction of a machine embodying the principles of my invention, Fig. 1 is a plan view of the machine; Fig. 2 is a front view; Fig. 3 is a side elevation of the left-hand side of the machine; Fig. 4 is a side elevation of the right-hand side of the machine; Fig. 5 is a transverse section through the rear end of the machine taken on the line 5—5 of Figs. 3 and 4; Fig. 6 is a central longitudinal section on the line 6—6 of Fig. 2; Figs. 7, 8, 9 and 10 are enlarged sectional detail views taken substantially on the line 6—6 of Fig. 2 and showing the sequence of operations of the blending and transfer boxes and the rolling apron; Fig. 11 is an enlarged transverse section taken substantially on the line 11—11 of Fig. 4; Fig. 12 is an enlarged detail plan view of a pair of separating knives; Fig. 13 is a section on the line 13—13 of Fig. 11; Fig. 14 is an enlarged sectional detail view of one half of the machine taken substantially on the section line 5—5 of Figs. 3 and 4; Fig. 15 is a section on the line 15—15 of Fig. 14 of an intermittent ratchet and pawl mechanism showing the pawl in its inoperative or disengaged position; Fig. 16 is a section similar to Fig. 15 but showing the pawl in its operative or engaged position; Figs. 17, 18 and 19 are sections on the lines 17—17, 18—18 and 19—19 respectively of Fig. 14; Fig. 20 is a transverse, vertical sectional detail through the parts shown in Fig. 14; Fig. 21 is a detail plan view of a feeding rake; Fig. 22 is a front elevation of the rake shown in Fig. 21; Fig. 23 is a detail side elevation of one of the pair of blending boxes and the cam for raising it at a predetermined point in its movement out of the path of movement of the other member of the pair of blending boxes; Fig. 24 is a detail side elevation of the weighted fingers, by means of which the amount of charge of tobacco fed to the blending boxes is determined, and the cam for actuating said fingers; Fig. 25 is a detail side elevation of the transfer box and the cam for actuating it; Fig. 26 is a detail side elevation of the forward set of feeding rakes and the cam for actuating them, and Fig. 27 is a sectional detail on the line 27—27 of Fig. 3 of the reduction gear for driving the blending box actuating mechanism.

*Framework and main driving mechanism*

The machine comprises a pair of side frames 10 and 11 suitably maintained in spaced relationship by a top bed plate and a plurality of tie-rods, hereinafter to be referred to, and which tie-rods are also employed as pivots for various moving parts of the machine. Mounted upon a suitable bracket 12, secured to the right-hand side frame 11, is an electric motor 13 which drives, by means of the belt 14, a worm shaft 15 (see Figs. 2 and 3), the latter having secured thereto a worm 15a which meshes with a worm wheel 16 free to rotate on the main drive shaft 17, and which shaft has secured thereto a plurality of cams hereinafter to be more fully described. Secured to the main drive shaft 17, adjacent to the right-hand frame 11, is a sprocket wheel 18 which drives, by means of the sprocket chain 19 and sprocket 19a, a cam shaft 20 (see Figs. 4, 6, 14 and 20). The cam shaft 20 has secured to it a second sprocket 21 which drives, by means of the chain 22, a sprocket 23 mounted on a feed mechanism actuating shaft 24, which is caused to be intermittently actuated in a manner hereinafter to be more fully described. The above described parts constitute the main driving members of the machine and have associated with them a number of cams and other auxiliary actuating devices each of which will be described in connection with the particular part which it actuates.

Tobacco feeding means

Bolted to the top of, and extending transversely across the machine between the side frames 10 and 11 is a bed plate, on which a number of the parts are supported. The side sections 10a and 11a of said bed plate support a pair of table sections 25 and 25a upon which is adapted to be placed a supply of main filler tobacco and a supply of blend filler tobacco respectively. Located between the table sections 25, 25a is a pair of feed belts 26, 26a upon which the two different brands of tobacco are placed by a feeding operator, a platform 27 being provided at the rear of the machine for the use of such operator.

The feed belts 26, 26a are arranged in aligned, transversely spaced relationship, as clearly shown in Fig. 1, and adjustable side rails 26b are provided, one on each side of each of the belts 26, 26a to prevent the filler tobacco from passing laterally off the belts. A pair of knives 260, one for each belt, is provided for cutting and trimming the tobacco into the proper lengths. Each of these knives is pivotally mounted, as at 261, to swing downwardly closely adjacent to the edge of a small shelf or table 262 located slightly above and at one side of its respective feed belt. Each knife is further provided with a tail 263 to the outer end of which is pivotally connected the upper end of a connecting link 264. The lower ends of the connecting links are in turn pivotally and slidably connected to a cross-rod 265 carried by the outer ends of a pair of levers 266, secured to a transverse shaft 267 adjacent to the side frames 10, 11. Secured to the shaft 267 between the levers 266 is a crank arm 268, the outer end of which has connected therewith the upper end of a second connecting link 269. The lower end of link 269 is pivotally connected to a second crank arm 270 secured to a cross shaft 271 (see Figs. 4 and 5), and a pedal or treadle 272 is also secured to said shaft 271 for enabling the operator to actuate the knives 260, through the members just described. A spring 273 connected to the treadle 272 and to any suitable stationary part of the machine is provided for holding the treadle and knives normally in their upper positions. The tables 262 are swivelly mounted, as at 274, on their respective bed plate side section to permit them to be swung to different adjusted inclined positions. As the lower ends of the connecting links 264 are slidable on the cross-rod 265, the turning of the tables is not prevented by the connection of the links to the knives 260.

The constructional details of the feed belts 26 and 26a and the instrumentalities with which they cooperate are identical, the construction of the machine with respect to such belts and instrumentalities being duplicated on each side of the longitudinal center line of the machine. Therefore, in describing the feeding mechanism a description of one half of the machine will suffice for both halves thereof. Referring to Figs. 1 and 6 of the drawings, the feeding belts are trained about a rear roller 28 and a front roller 29, the upper reach of the belts forming a horizontally extending movable platform upon which the tobacco is supported and carried into the machine. The front roller 29 (see Figs. 14 and 20) is driven by means of the gears 30 and 31, the gear 30 being secured to the roller 29, and the gear 31 to the feed mechanism actuating shaft 24 above mentioned. Located adjacent to the front roller 29 and slightly above the belts are a plurality of stationary plates 32, shown best in Fig. 20 of the drawings, between which and the upper surface of the belt the tobacco is confined as it travels forwardly into the machine. The plates 32 are in the form of a plurality of finger-like extensions of a casting 33 (see Figs. 5 and 6) bolted between the brackets 34, and said plates, as shown in Figs. 14 and 20, are located at spaced intervals transversely of the machine. Secured to the shaft 24 is a member 36 which is turned to provide a plurality of spaced star wheels 37, the periphery of said members being milled out to form a plurality of teeth, as clearly indicated in Figs. 6 to 10, inclusive, and 14. These star wheels, as shown in Figs. 14 and 20, extend through the spaces between the retaining plates 32, and the teeth thereof terminate closely adjacent to the upper run of the belts 26, 26a. The star wheels and belts are intermittently actuated by mechanism, hereinafter to be described, to operate in unison, the teeth of the wheels engaging the tobacco on top of the belt and feeding it under the plates 32 above referred to. After the tobacco is fed under said plates, it passes to a stationary table or shelf 38 formed by a front transverse bar of the bed plate (see Fig. 7) and is carried forwardly across said table by the rakes 39.

The rakes 39, shown detailed in Figs. 21 and 22, are provided with a plurality of spaced tines 40 which straddle the plates 32. Each rake 39 is supported by a pair of side arms 41 the construction of which is shown best in Fig. 19 of the drawings. These side arms have imparted to them a combined reciprocating and oscillating movement, so that the rakes are moved horizontally and forwardly from the position shown in full lines in Fig. 19 to the dotted line position shown in said figure, after which the rakes are raised and moved backwardly and then permitted to drop again to the full line position. To enable this movement to be given to the rakes, the side arms 41 are pivotally connected with swinging links 42, there being, as will readily be understood, one of said links for each of said side arms and each pair of said links being, in turn, pivotally supported upon a transverse rod 43 located above and slightly rearwardly of the cam shaft 24. Pivotally supported by means of a fixed pivot 44 secured in the brackets 34 and so that it will lie closely adjacent to its respective side arm 41, is an oscillating trip 45 having a projecting tailpiece which rests upon a roller 46 mounted at the rear end of each side arm 41. The oscillating trip 45 is further provided with a cam roller 47 which rests against the periphery of a cam 48 secured to the cam sleeve 53. A spring 49, having its ends secured respectively to the swinging link 42 and the side arm 41, serves to hold the cam roller 47 pressed against the cam 48.

Each rod 43 is oscillated in proper timed relationship to the movement of the other parts of the machine by means of a crank arm 50 secured to the outer end of said rod, there being two crank arms 50, one for each rod 43 and rake 39. Each crank arm 50 is provided with a cam roller 51 which engages with the inner race of a cam 52 secured to a hollow sleeve 53 loosely mounted upon the feed mechanism actuating shaft 24. The oscillation of the shaft 43, by means of the cam 52, will cause the swinging links 42 to oscillate the side arms 41 forwardly and rearwardly of the machine. As shown in Fig. 19, just as the side arms 41 and the rakes 39 carried thereby begin their forward movement, the cam roller 47 has just moved down off the throw of the cam 48. As the parts move forwardly, the side arms 41 move forward relatively to the oscillating trip 45, the roller 46 travelling along the lower face of said trip. The slight inclination of the lower face of the trip shown in the drawing does not, however, cause the tines 40 of the rake to be raised off the shelf 38 because of the fact that the swinging link 42 is moving downwardly in the arc of a circle. When the rake 39 reaches its forward limit of travel, the throw of the cam 48 comes into engagement with the cam roller 47 and gives a slight clockwise movement to the oscillating trip 45 about its fixed pivot 44, sufficient to depress the rear ends of the arms 41 and raise the tines of the rake to their upper position. While the rakes are thus held in their upper position by the throw of the cam 48, the cams 52 cause the oscillating rod 43 to swing the rakes 39 back to their rearward limit of travel and to return the parts to the full line position shown in Fig. 19. As will be seen from Fig. 4, the drive 21, 22, 23 has a gear ratio of about 2:1 so that shaft 24 will make two revolutions to one of the shaft 20, and the cams 48 and 49, as shown in Figs. 18 and 19, are designed to produce three oscillations of the rakes 39 for each revolution of the shaft 24. The extent of movement of the rakes 39, as indicated in Fig. 19, is relatively small; therefore, as the tobacco is fed by said rakes into the blending boxes, it is divided into a plurality of relatively small portions, thus gradually building up the charge in the blending boxes by small increments in a manner quite similar to that employed in hand work.

*Blending boxes*

A bracket 60 (see Fig. 11) is secured to the side frame 10 substantially midway of the machine and slightly forward of the transverse plane in which the front end of the belts 26 terminate. Mounted in said bracket and a pair of brackets 96, 97, and extending transversely across the machine, is a pair of rods 62 and 63 which form slideways for the blending boxes 64 and 65. The box 64 is provided with the apertured ears 66 through which the rod 62 passes, while the box 65 is provided with an apertured boss 67 through which the rod 63 passes. Projecting from the apertured boss 67 is a lug 68 having an aperture through which a rod 69 passes, said rod 69 being mounted between a pair of brackets 70 secured to the rod 63. The brackets 70 not only serve as stops to limit the movement of the box 65 transversely across the machine but also serve to transmit to said box a vertical swinging movement, as will be hereinafter set forth.

Movement of the boxes 64, 65 transversely of the machine is effected through the medium of a pair of steel bands or belts 71, 72. One end of the belt 71 is attached to one of the apertured ears 66 of the box 64 and said belt is trained about an idler 73 rotatably mounted upon the bracket 60, and then about an actuating drum 74 also mounted on said bracket. The other end of the belt 71 is attached, as indicated at 75, to one end of the boss 67 of the blending box 65. One end of the other belt 72 is similarly secured to the other apertured lug 66 of the box 64 while its other end is similarly secured to the end of the boss 67 of the box 65, and said belt 72 is trained about an idler pulley 76 rotatably mounted in the bracket 96. The belts 71, 72 with the blending boxes 64, 65 secured thereto form, in effect, an endless belt which is actuated in predetermined timed relationship to cause the blending boxes to be moved, by mechanism presently to be described, transversely and simultaneously, across the machine, first in one direction and then in the other until each blending box is brought into alignment with either of the belts 26 or 26a.

Secured to the shaft upon which the actuating drum 74 is mounted, is a spur pinion 77 with which is engaged the gear teeth of a gear sector 78, said sector being pivotally mounted, as at 79, on the bracket 60. A connecting rod 80 has its upper end pivotally connected, as at 81, to the sector 78. The lower end of the connecting rod 80 is secured to one end of a lever 82 (see Fig. 3), the other end of said lever being pivotally supported upon a pivot shaft or tie rod 83 extending transversely of the machine and being supported in the side frames 10, 11. Between its ends the lever 82 is provided with a cam roller 84 which is engaged with the cam 85 mounted upon the cam shaft 20.

As will be readily understood from the foregoing description, the cam 85 effects the transverse movement of the blending boxes across the machine, but a complete reciprocation of such boxes is completed only after the completion of two cycles of operation of the other parts of the machine. That is to say, the boxes 64, 65 are held stationary before the belts 26, 26a, during a certain part of the cycle of operations of the other parts of the machine, are then moved transversely to reverse their positions relatively to said belts and are held stationary while the same part of the cycle of movements of said other parts is again repeated, after which they are again moved transversely but in the reverse direction, to their former positions, thereby completing a full reciprocation. It will thus be seen that the cam 85 must be so driven that it will complete a half revolution only while the other cams on the cam shaft 20 are making a full revolution. This is accomplished by the mechanism shown in Fig. 27 from which it will be seen that the cam 85 is not keyed to but is rotatably mounted on the cam shaft 20 and is provided with a boss 85a upon which is keyed a spur gear 85b. The spur gear 85b meshes with a gear 85c forming one of a pair of idler gears 85c, 85d rotatably mounted on a stub shaft 85e projecting from a bracket 85f supported on the ends of the cam shaft 20 and pivot shaft 83. The idler gear 85d is in mesh with a spur pinion 85g keyed to the cam shaft 20 and the gears 85b, 85c, 85d and 85g operate to produce a two to one gear reduction from the cam shaft 20 to the cam 85 in a manner which will be readily understood.

The outer end of the rod 63, upon which the blending box 65 is supported, has secured to it a crank arm 86 (see Fig. 11), connected by means of the connecting rod 87 with a lever 88 (see Fig. 3), also pivotally supported upon the pivot shaft 83. The lever 88 is provided between its ends with a cam roller 89 which engages with a cam 90 (see Fig. 5) which serves to impart an oscillating movement to the rod 63 at the proper time, to cause the blending box 65 to be swung upwardly from the position shown in Fig. 7 of the drawings to the position shown in Fig. 8 thereof, and thereby permit the boxes 64 and 65 to pass each other in their transverse movement across the machine. The extent of movement given to the blending boxes by the cams 85 and 90 and the parts connected therewith, and the location of the stops 70, are such that the boxes will be brought to rest and will normally be located in longitudinal alignment with the belts 26, 26a. Each box, as shown most clearly in Figs. 7 to 11, inclusive, is provided with a receptacle 91 the width of which, transversely of the machine, is substantially equal to the width of the belts 26, 26a and the height of which is approximately that of the diameter of the cigars to be manufactured. This receptacle, as clearly shown in Figs. 7 to 10, inclusive, is open at the front and rear ends thereof, and when the blending boxes are brought to their normally stationary positions in alignment with the belts, the open rear ends of the receptacles are located just forwardly of, and closely adjacent to, the shelf 38 over which the tobacco is fed by the rakes 39. As the rakes 39 move forwardly to feed the tobacco across the shelf 38, they force the tobacco into the rear open end of the receptacle 91 of each of the blending boxes, as shown most clearly in Fig. 10 of the drawings.

The top wall of the receptacle 91 of each of the blending boxes is provided with a plurality of spaced slots 92 (see Fig. 11) into which is adapted to project a plurality of fingers 93 (see Figs. 2 and 7 to 10, inclusive). These fingers serve to determine the amount of tobacco charged to each respective blending box by the belts 26, 26a and also serve to actuate automatically the clutch mechanism by means of which the feed mechanism actuating shaft 24 is set in operation at the proper predetermined time. In order to prevent the tobacco from falling out of the receptacle 91 of the blending box 65 when the box is swung by the cam 90, a plurality of pins 65a project through suitable apertures in the bottom of the box, as shown most clearly in Fig. 8 of the drawings. These pins are mounted on a rod 65b extending between a pair of bell crank levers 65c, a coil spring 65d (see Fig. 11) encircling the rod 65b and being connected therewith in the well-known manner to cause the pins 65a to project normally into the receptacle 91 of said box 65, as shown in Fig. 8 of the drawings. The bell crank arm 65b is provided with a tail 65e which is adapted, when the blending box 65 is swung to its lower position, as shown in Figs. 9 and 10 of the drawings, to engage with a guide-rail 65f and thereby rotate the crank arms 65c and cause the pins 65a to be withdrawn, against the action of the spring 65d out of the receptacle 91, as clearly shown in Figs. 9 and 10 of the drawings.

*Charge regulating device*

Two sets of fingers 93 are provided, one for each of the belts 26, 26a respectively, and said fingers project downwardly from and are integral with a boss 94 loosely mounted upon a cross-rod 95 extending transversely across the machine, and having its ends supported in the brackets 96, 97. Secured to the rod 95 is an arm 98 provided with a slot 99 which straddles a pin 100 secured in the leg 101 of a U-shaped member 102 (see Figs. 1, 2 and 17). Said member is loosely mounted upon the rod 95, and the pin 100 projects through the casting of which the fingers 93 are a part, so that the pin 100 serves to secure together the U-shaped member 102 and the fingers 93 to cause said parts to move in unison about the rod 95 as a pivot. Screwed into each of the U-shaped members 102, adjacent to the leg 103, at the outer side thereof, is a screw-threaded rod 104. By referring to Fig. 2 of the drawings, it will be noted that the rod 104, located on the right-hand side of the machine for the fingers 93 which are in alignment with the belt 26a upon which the blend filler is fed to the machine, is provided with a single weight 105, while the rod 104, located at the left-hand side of the machine and cooperating with the fingers 93 in alignment with the belt 26 upon which the main filler is fed to the machine, is provided with one or more weights 106. These weights 105, 106 are provided with screw-threaded apertures for engagement with the rods 104, so that by rotating the weights, they can be adjusted longitudinally of said rods 104, the periphery of the weights being knurled in order that they may be readily rotated to adjusted position. The lower or outer free ends of each of the levers 103 is provided with an adjustable screw 107 (Fig. 17) adapted, when the fingers 93 are in their lowermost position shown in Fig. 10 of the drawings, to engage with the tail 108 of a stop pawl 109.

As the tobacco is forced by the rakes 39 into the receptacles 91 of the blending boxes (as shown in Fig. 10), the lower ends of the fingers 93 are held by the weights 105, 106 to project into the blending boxes which are then in alignment with the belts 26, 26a. Because of the fact that a smaller amount of the blend filler is used than of the main filler, only a single weight 105 is mounted upon rod 104 for the fingers 93 which are in alignment with the belt 26a, while as a greater amount of the main filler is employed for each cigar, a pair of weights 106 is mounted upon the rod 104 for the fingers 93 which are in alignment with the belt 26 upon which the main filler is fed to the machine. The number of weights 105, 106 respectively employed is, however, immaterial because as the weights are adjustable longitudinally any desired number of weights can be used on either rod 104.

As the tobacco is fed inwardly by the rakes 39, the pressure of the tobacco against the fingers 93 tends to rotate said fingers against the action of the said weights to operate the clutch for the feed actuating mechanism in a manner presently to be described.

It will be understood that during the time the rakes 39 are moving forwardly, the blending boxes 64, 65 will be in a position such that the tobacco is fed by the rakes into the receptacle 91 of each respective box, the boxes being held stationary to receive the charge of tobacco. At certain times during the operation of the machine and while the rakes are so feeding, the boxes 64 and 65 will be in alignment with the belts 26, 26a respectively, while at a similar stage in the next cycle of operations of the machine, the position of the boxes will be reversed so that the boxes 64, 65 will be in alignment with the belts 26a, 26 respectively. Fig. 7 of the drawings shows the parts just before the transverse movements of the boxes begin, the box 64 now being in alignment with the belt 26 and the box 65 in alignment with the belt 26a. As the transverse movement of the boxes 64, 65 occurs, the box 64 travels in a straight line, and during its movement across the machine, is held in the position shown in Figs. 7 and 8 by its engagement with the rod 62 and the guide rail 65f, this travel of said box being from the left to the right-hand side of the machine. During this travel of the box 64, the box 65 is moving in the opposite direction across the machine, that is, from right to left, and the latter is swung, by means of the cam 90, connecting rod 87, crank arm 86, and rod 63 and connected parts, to the position shown in Fig. 8, thereby moving the box 65 out of the path of movement of the box 64. After the two boxes have passed each other in their transverse movement across the machine, the box 65 is moved downwardly to the position shown in Fig. 9 and is brought to rest in such downward position in alignment with the belt 26, thereby bringing the box 65, as shown in Fig. 9, to the position formerly occupied by the box 64, while the box 64 is brought into the position at the other side of the machine formerly occupied by the box 65. As indicated in Figs. 8 to 10 of the drawings, the box 65 received a charge of blend tobacco when it was in alignment with the belt 26a, and during the swinging movement of the box indicated in Fig. 8, the pins 65a are projected into the interior of the receptacle 91, thus serving to prevent the charge of blend tobacco from falling out of the box during the swinging movement. When the box 65 is swung to its lower position, the pins 65a are withdrawn, as indicated in Fig. 9, and the box 65, containing a predetermined charge of blend filler, is now in position to receive its charge of main filler. This is done in the manner indicated in Fig. 10 of the drawings by means of the rakes 39, the operation of which has been heretofore described, it being understood that while the main filler is being charged and mixed with the blend tobacco in one box, the other box is simultaneously receiving a charge of blend tobacco from the belt 26a, and the amount of tobacco being charged to each box being determined partially by the adjustment of the weights 105, 106 before referred to, but more particularly by the adjustment of screws 107 (see Fig. 17).

A pair of knives 240, 240a (see Figs. 6 to 12, inclusive), one for each of the belts 26, 26a, extends across the machine from the sides towards the center thereof and closely adjacent to the forward end of the shelf 38. Each knife is pivotally mounted at one end upon a short stub shaft 241 the axis of which extends longitudinally of the machine. A depending leg 242 at the other end of each knife has pivotally secured thereto, the upper end of a connecting link 243, the lower end of which is pivotally connected to a pivot block 244 (see Fig. 5) having a pair of depending ears which straddle a boss 245 at the outer end of a lever 246. The lever 246 is pivotally supported on the pivot shaft 83 and carries a cam roller 247 which engages within the race of a cam 248 secured to the cam shaft 20.

The cam 248, as shown in Fig. 6, causes the knives 240 to be swung upwardly and downwardly in proper predetermined relationship to the movement of the other parts to cut through the layers of tobacco that were fed forwardly by the belts 26, 26a and rakes 39.

*Clutch actuating mechanism*

The weights 105, 106, combined with the weights of the fingers 93 themselves, will hold said fingers normally in the position indicated in Fig. 10 of the drawings, and as the tobacco is forced into the blending boxes 64, 65 by the action of the rakes 39, the pressure of the tobacco forced into the boxes will tend to swing the fingers in a counter-clockwise direction (Fig. 10), thereby moving the U-shaped member 102 in unison and thus moving the lever 103, carrying the adjustable screw 107 (Fig. 17) so that said screw will move out of contact with the tail 108 of the pawl 109. When the fingers are in their lowermost position, the screw 107 is in engagement with the tail 108, thereby causing the pawl 109 to be held out of engagement with the teeth of a ratchet wheel 110 (see Fig. 16), and as the screw moves out of engagement with said tail, said pawl will be brought into engagement with the teeth of the ratchet wheel 110 (see Fig. 17) by the action of a spring 111 suitably secured to said tail and to the bracket 96. During the time the fingers 93 are in their lower position and the pawl 109 is out of engagement, the feeding mechanism is in operation, while when the pawl 109 is operative, the feed mechanism is stopped, as will presently appear. The ratchet wheel 110, as clearly shown in Fig. 20 of the drawings, is rotatably mounted upon the hollow sleeve 53, hereinbefore referred to, which, in turn, is also rotatably mounted upon the feed mechanism actuating shaft 24. A second ratchet wheel 113 is also loosely mounted upon said shaft and sleeve, and interposed between said ratchets is a pawl-carrying arm 114 the central boss of which is keyed to the hollow sleeve 53 hereinbefore referred to. The pawl-carrying arm 114 is provided (as clearly shown in Fig. 15) with a pair of radially extending arms, the one shown at the upper part of Fig. 15 having secured therein a pin 115, said pin carrying loosely at its outer ends a U-shaped member 116 (see Figs. 14 to 17, inclusive, and Fig. 20) the legs of which define a pawl 116a and a trip 117. The lower end of the trip 117 is adapted to be engaged by a pin 118 projecting laterally from the side of the ratchet 110, while the pawl 116a is provided with a laterally extending pawl tooth 119 adapted to engage with the teeth of the ratchet wheel 113 when the U-shaped member is caused to be rotated by the engagement of the pin 118 with the trip 117. A coil spring 116b has one end thereof secured to the member 116 and its other end anchored to a pin 116c secured in the lower end of the other arm of the pawl-carrying arm 114. To hold the pawl tooth 119 normally out of engagement with the teeth of the ratchet wheel 113, a second spring 116d has its ends anchored, one to a pin 116e projecting laterally from the ratchet wheel 110 and the other end secured to a pin 116f projecting laterally from the pawl-carrying arm 114, thus serving to hold the pawl tooth 119 in mesh with the teeth of the ratchet wheel 113, by reason of the pin 118 bearing against the trip 117 (see Fig. 16).

The sprocket 23, hereinbefore referred to, by means of which the motive force is transmitted from the shaft 20 to the shaft 24 is not directly mounted upon said shaft 24, but is keyed to the boss of a spur gear 120 rotatably mounted upon the hollow sleeve 53. The ratchet wheel 113 is also keyed to the other end of the boss of said spur gear, the three members, namely the sprocket 23, the spur gear 120, and the ratchet wheel 113, rotating in unison, as will be clearly evident from an inspection of Fig. 20 of the drawings. Assuming that these three members are rotating and that the parts are as shown in Fig. 15 with the fingers 93 raised and the pawl 109 in engagement with the ratchet 110, the pawl tooth 119 will be held out of engagement with the teeth of the ratchet wheel 113 by means of the spring 116$b$ and therefore the rotation of the ratchet wheel 113 will not be operative to cause any movement of the parts beyond said ratchet wheel. When the lever 103 and fingers 93 are actuated by mechanism presently to be described to bring the adjusting screw 107 in contact with the tail 108 of the pawl 109 and thereby move the stop pawl 109 out of engagement with the teeth of the ratchet wheel 110, the spring 116$d$ will pull the ratchet wheel 110 in a clockwise direction, as indicated by the arrow in Fig. 17, thus causing the pin 118 to push the trip 117, the U-shaped member 116, and pawl 116$a$ in a counter-clockwise direction, thereby to bring the pawl tooth 119 into engagement with the teeth of the ratchet wheel 113 against the action of the spring 116$b$, it being understood that the spring 116$d$ is of stronger tension than the spring 116$b$. When this occurs, the parts are moved from the positions shown in Fig. 15 to those shown in Fig. 16. As the pawl-carrying arm 114 is keyed to the hollow sleeve 53, which carries the cams 48 and 52 for actuating the feed rakes 39 hereinbefore described, its rotation is imparted to said sleeve, thereby putting the feed actuating mechanism in operation. Secured upon the oscillating rod 43 heretofore described, which, it will be remembered, is oscillated by the cam 52 and crank arm 50, is a crank arm 121 having pivotally connected to its outer end, as at 122, one end of a link 123 (see Figs. 14 and 18). The other end of the link 123 is pivotally connected at 124 to a pawl-carrying arm 125 having a hollow boss 125$a$, which is mounted rotatably upon the boss of the cam 48, hereinbefore referred to (see Fig. 20). The pawl-carrying arm 125 has pivotally mounted upon its outer end a pawl 126 normally held by the coil spring 127 in engagement with the teeth of a ratchet wheel 128. The ratchet wheel 128 is keyed by the key 129 to the feed mechanism actuating shaft 24. Oscillation of the oscillating rod 43 will, by the mechanism just described, cause an intermittent movement of the shaft 24, thus causing the star wheels 37 to be rotated intermittently and the belts 26, 26$a$ also to be rotated intermittently in unison therewith.

The spur gear 120 is in mesh with a spur wheel 130 keyed to a transverse shaft 131 (see Figs. 14 and 20), which shaft extends across the machine and is provided at its other end with a spur gear 132 (see Fig. 2), the latter meshing with a spur wheel 133 similar to the spur gear 120. This spur gear 133 has keyed to its boss another ratchet wheel 113 similar to the ratchet wheel hereinbefore described, and all of the driving members which are mounted upon the shaft 24, as just described, are duplicated upon the other side of the machine, and their operation is identical with those which have just been described.

Mechanism for moving charge determining fingers out of blending boxes

In addition to the movement of the fingers 93 produced by the pressure of the tobacco against them as the tobacco is fed into the blending boxes, said fingers are given an additional movement to swing them from the position shown in Fig. 10 to the position shown in Figs. 7 and 8, this movement of the fingers being necessary in order to move them out of the path of movement of the blending boxes as said boxes are travelling transversely across the machine, and also to move the fingers out of the way so that the passage of the tobacco through the blending boxes to the transfer box may be effected. For securing this movement of the fingers, the shaft 95, upon which the fingers 93 are mounted, has secured to it a crank arm 135 having pivotally connected to its outer end the upper end of a connecting rod 136 (see Figs. 1, 3 and 24), the lower end of said connecting rod being pivotally secured to one end of a lever 137, the other end of which is pivotally mounted upon the pivot shaft 83. Between its ends, the lever 137 is provided with a cam roller 138 which engages within the race of the cam 139 keyed to the cam shaft 20. As the cam shaft 20 and cam 139 rotate, the throw of the cam will cause the fingers 93 to swing upwardly and downwardly as indicated in Figs. 7 to 10, inclusive, this swinging movement of the fingers being caused to occur in proper timed relationship to the transverse movement of the blending boxes 64, 65 in a manner which will be readily understood. It will be understood that the movement of the fingers 93 by means of the cam 139 is independent of the movement of the fingers 93 by the pressure of the tobacco fed into the blending boxes, which latter movement causes the lever 103 and screw 107 to be moved sufficiently to permit the pawl 109 to stop the feed actuating mechanism, the lost motion of the pin 100 within the slot 98 permitting sufficient movement of the fingers and U-shaped member 102 to insure stopping of the feed actuating clutch independently of the movement of the fingers by the cam 139. During the time the fingers are being moved upwardly by the cam 139, the feeding mechanism comprising the belts 26, 26a, the star wheels 37 and the rakes 39 are stopped, while when the cam 139 returns the fingers and lever 103 to their lower position, the feeding mechanism will again be placed in operation if the charges in the blending boxes have been removed so that the weights 105, 106 can exert sufficient force against the action of the spring 112 to move the pawl 109 back into engagement with the ratchet wheel 110.

*Means for feeding tobacco through the blending boxes and to the transfer box*

Located in longitudinal alignment with each of the feeding belts for cooperation with the blending box in position before each belt is a rake 140 (see Figs. 6 to 10) fixed to the free ends of a pair of rods 141 pivotally mounted at their other ends, as at 142, to the lower end of an oscillating arm 143, said arm being secured to a cross-rod 144 supported between the brackets 96, 97. Secured to the shaft 144 is a crank arm 145 having pivotally connected to its outer end the upper end of a connecting rod 146. The lower end of the connecting rod 146 (see Fig. 4) is pivotally connected to one end of a lever 147, the other end of said lever 147 being pivotally supported upon the pivot shaft 83. Between its ends, the lever 147 is provided with a cam roller 147a which engages within a cam 148 mounted upon the cam shaft 20. The cam 148 serves to oscillate the arm 143, through the connections above described, to cause a swinging movement of the rakes 140 forwardly and rearwardly of the machine for effecting the feeding of the tobacco through the blending boxes. In addition to this forward and rearward movement, the rakes are also given an upward and downward oscillating movement, so that the full movement of the rakes is a compound movement. The upward and downward swinging movement of the rakes has a two-fold purpose, first to move the rakes out of the way of the fingers 93 and to permit the transverse movement of the blending boxes, and second, to move the rakes over the top of the tobacco as the rakes are moving rearwardly and to engage behind the tobacco before said rakes start moving forwardly. This vertical swinging is effected by the following mechanism:

Pivotally supported upon the pins 150 mounted in the brackets 96, 97, are the plates 151, one for each pair of arms 141 and located closely adjacent to, but on one side of, each outer arm 141. Each of the plates 151 carries a pair of rollers 152 which project laterally from said plates and are located above and below the arms 141. Each plate 151 has pivotally connected thereto the upper end of a connecting rod 153, the lower end of which is pivotally connected with a lever 154.

Said lever 154 has its other end pivotally mounted upon the pivot shaft 83 and is provided between its ends with a cam roller which engages with the cam 155 (see particularly Fig. 26). It will be obvious from an inspection of Fig. 26 of the drawings, that as the lever 54 is actuated by the cam 155, the plates 151 will be swung upwardly and downwardly, thereby causing the rakes 140 to be raised and lowered, this vertical swinging movement of the rakes being caused to occur in proper predetermined relationship with the longitudinal or horizontal swinging movement thereof, so as to cause the rakes to move from the rear to the front of the machine while in their lowermost position within the slots 92 of the blending boxes, and thus pull the tobacco out of the blending boxes, while when the rakes are raised to their upper position, they not only are out of said slots to permit the fingers 93 to move to their lowermost position and to allow the transverse movement of said boxes, but also are moved rearwardly to pass over the tobacco fed into the blending boxes by the action of the rakes 39.

The forward travel of the rakes is of sufficient extent, as clearly shown in Fig. 7 of the drawings, to pull the mixed charge of blend and main filler entirely out of the blending box, which is in position in front of the main filler belt 26, and into the transfer box. As the forward travel of both rakes 140 is effected by the same cam 148, it will be seen that this extent of travel would cause the blend filler to be drawn entirely out of the blending box in position before the blend filler belt 26a unless means were provided to prevent this. These means consist of two things, the first being that the right-hand cam 155 for the right-hand rake 140 is so designed that said rake will be raised after it travels forward about one third of its stroke through the blending box receptacle, and the second residing in the provision of a plurality of pins 300 (see Figs. 11 and 13) projecting from a cross-bar 301 at the upper end of a swinging lever 302, the lower end of which is pivotally supported on one of the stub shafts which supports the transfer box 162 presently to be more fully described. The swinging lever 302 is normally held against the stop 303 secured to the side frame 11, by means of a spring 304 in the dotted line position shown in Fig. 13, in which position the lever 302 and pins 301 are withdrawn from their operative position with respect to the blending boxes. For moving the lever 302 and pins 300 to operative position, an arm 305 is secured to one of the side bars of the casting 163 upon which the transfer box 162 is mounted so that when the transfer box is moved to its upper position the arm 305 engages the lever 302 and moves it rearwardly to the full line position shown in Fig. 13, in which position it will be noted that the pins 300 will be located within and closing the forward end of the blending box.

The rotating of the cam shaft 20 is under the control of a one-revolution clutch 160 which is actuated by the foot pedal 161 located at the front end of the machine for operation by the operator. The contour of the cams 148 and 155, the location of the cams upon the cam shaft 20, and the arrangement of the one-way clutch 160 are such that the clutch 160 is disengaged automatically just as the rakes 140 have about completed one half of their movement through the blending boxes 64, 65 or, in other words, an amount sufficient to bring the tobacco within the blending boxes, and particularly that within the box 65, forwardly of the pins 65a. The machine is then stopped until the operator again depresses the treadle 161 to engage the clutch 160 in order that the further operations of the machine, presently to be described, will not take place until the operator has had an opportunity to place a binder in the machine in position to be rolled about its charge of mixed filler. When the operator depresses the pedal, the rakes 140 will again resume their forward movement and will transfer the charge of tobacco then in the blending box in alignment with the belt 26, to the transfer box 162.

*Transfer box*

The transfer box 162, as clearly shown in Figs. 6 to 11, inclusive, and Fig. 25, is secured upon the upper end of a casting 163 having a pair of side arms pivotally mounted at their lower ends upon a pair of stub shafts 163a. Said casting is provided with a short crank arm 163b to the outer end of which is pivotally connected one end of a short connecting link 164. The other end of the connecting link 164 is pivotally connected to one end of a lever 165, the other end of which is pivotally supported upon the pivot shaft 83. Between its ends, the lever 165 is provided with a cam roller 166 which engages within the race of a cam 167.

The cam 167 is designed to cause the transfer box 162 to be moved, shortly after the rakes 140 reach their forward limit of travel, from the position shown in Fig. 7 of the drawings to the position shown in Fig. 9.

In order to prevent the filler from dropping out of the transfer box as it is moving from its upper to its lower position, a plate 168 is pivotally mounted at the forward end of the box and is adapted to be held normally by a spring, not shown, in the position in Figs. 7 and 8 of the drawings. This plate 168 has connected therewith a trip 169 adapted to engage with a part of the apron actuating means, presently to be described, to move the plate out of the position shown in Figs. 7 and 8 and thereby uncover the end of the transfer box, thus permitting the tobacco to be ejected therefrom.

*Rolling apron and associated parts*

When the transfer box 162 moves to the position shown in Fig. 9, it passes into a slot 170 provided in an apron-supporting table 171 suitably supported at the front end of the machine. Extending across the apron-supporting table is a flexible belt or apron 172 the ends of which are anchored as indicated at 173 and 174 (see Figs. 6 to 10), to said apron-supporting table. Between its ends, the apron 172 passes over a roller 175 extending between the side bars of a casting 176 (see Figs. 2 to 6). The casting 176 is secured at its lower end upon a shaft 177 having a crank arm 178 also secured thereto. The crank arm 178 is connected, by means of a link 179, with one end of a lever 180 the other end of which is pivotally supported on a cross-rod 181 passing between the side frames. Between its ends the lever 180 is provided with a cam roller 182 which engages within a cam 183 secured upon the main drive shaft 17, the cam serving to impart an oscillating movement to the casting 176 from the position shown in Fig. 7 to a position at the forward end of the apron-supporting table 171 beyond that shown in Fig. 10.

Pivotally mounted upon the rear end of the apron-supporting table 171 is a bell crank lever 185, one arm of which carries a roller 186 about which the apron 172 is trained. The other end of the bell crank lever 185 is connected to the upper end of a connecting rod 187, the lower end of said rod being connected with one end of a lever 188 which is pivotally supported upon the cross-rod 181. The lever 188 is provided with a cam roller 189 which engages within a cam 190 secured upon the main drive shaft 17.

The front end of the apron table 171 is provided with a pair of lugs 191 (see Figs. 2, 9 and 10) between which a pivot shaft 192 is mounted. The pivot shaft 192 carries a small shelf 193 which is normally held by a spring 194 (see Fig. 2) in the position shown in Figs. 9 and 10, said shelf serving as a collector or receptacle into which the cigar bunch is delivered by the rolling mechanism.

In order to prevent the formation of creases or wrinkles in the binder leaf 200, the casting 176 has pivoted thereto a frame 195 which straddles the apron table 171 and has at its upper end a horizontally extending, flat, blade-like, crosspiece or ironer 196 which is normally urged by a tension spring 197 to a position closely adjacent to the roller 175. When the casting 176 is located in its forward position, such as shown in Fig. 10 of the drawings, the ironer 196 will lie closely adjacent to the periphery of the roller 175, as clearly shown in said figure, while when the casting 176 is travelling through the rearward portion of its path of movement, the vertical side bars of the frame 195 contact with stop pins 198 which project laterally from the apron table 171 and check the movement of the frame 195 and ironer 196, thereby causing a relative movement between the casting 176 and frame 195 to be produced against the tension of the spring 197, the parts being now in the position shown in Fig. 9.

The full amount of separation between the casting 176 and the ironer 196 occurs just at the time the one-revolution clutch 160 becomes disengaged at the end of the cycle of the machine, the parts being in the position shown in Fig. 6 of the drawings. The operator then places a binder leaf 200 upon the apron 172 and ironer 196 so that the edge of the leaf will extend slightly beyond the rear edge of the ironer. After the operator has depressed the clutch actuating pedal 161 to start the machine in operation, and, in the operation of the parts, the transfer box 162 is swung from the position shown in Fig. 7, said box will move down into contact with the apron 172, the trip 169 engaging the top of the table 171 at the side of slot 170 and moving the plate 168 from the position shown in Fig. 8 of the drawings to the position shown in Fig. 9, thus uncovering the forward or lower end of the transfer box. As the transfer box moves to its lowermost position, as shown in Fig. 9, the lower or forward end of the box engages with the apron 172 and the edge of the binder leaf, and forces said apron downwardly into the slot 170, the transfer box entering said slot, as clearly shown in Fig. 9, and drawing the leaf across the ironer and downwardly into the slot. When this is happening, the bell crank 185 is moved to its upper position, shown in Fig. 9, to relieve the tension on the apron to a sufficient extent to permit it to be thrust downwardly into the slot 170. After this occurs, the filler is ejected from the transfer box onto the apron 172 by the following mechanism:

Mounted in a bracket 201 (see Fig. 2) suitably secured to the side frame 11, is a vertically reciprocating rod or shaft 202 having secured to its upper end a cross-arm 203. This cross-arm has secured to it a plunger 204 having approximately the same width and thickness as the receptacle of the transfer box. A collar 205 (see Fig. 4) is secured to the vertically reciprocating shaft 202 and is pivotally connected with the upper end of a link 206, the lower end of said link being connected to a lever 207 secured to a short shaft 208. This shaft also has secured to it a crank arm 209 which is connected by means of the connecting rod 210 with a lever 211. The lever 211 is pivotally supported upon the cross-rod 181 and carries a cam roller 182 which engages within a cam 212 mounted upon the main drive shaft 17.

General operation of the machine

The operation of the machine is as follows:
The feeding operator stationed at the rear end of the machine keeps the belts 26 and 26a well supplied with main filler and blended filler respectively. As the operator removes the filler tobacco from the tables 25, 25a, she places it under knives 260, 260a and operates the foot pedal 272 to cut the tobacco into the proper lengths. The work of the operator at the feeding end of the machine may be said to be entirely independent of the work of the operator at the front or finishing end of the machine, all that is required of the feeding operator being to keep the belts supplied with tobacco, uniform feeding not being necessary.

Assume that the parts are in the positions shown in Fig. 6 of the drawings which shows the various members in their position of rest after the one-revolution clutch 160 has operated automatically to stop the rotation of the main driving shaft 17. For clarity of description, it will also be assumed that no tobacco is in either of the blending boxes or the transfer box. As shown in Fig. 6, which illustrates the position of the parts at the beginning of the cycle of operations, the fingers 93 are in their raised position out of the receptacles 91 of the blending boxes, the rakes 140 are approximately at the middle of their lower operative path of movement within the blending boxes, the knives 240 are in their lower positions, the rakes 39 are just moving rearwardly and downwardly to engage behind the tobacco leaving the belts 26, 26a, the blending boxes are in their stationary positions in front of the belts 26, 26a, the transfer box 162 is in its upper position in contact with the front end of the blending box 64 then before the belt 26, and the frame 176 which carries the roller 175 for the rolling apron 172, is in its extreme rearward position with the ironer 196 spaced its full distance from the roller 175. If, now, the treadle 161 is depressed to operate the one-revolution clutch 160 and thereby cause the main driving shaft 17 to begin its revolution and also to drive the cam shaft 20, the cam 139 on said cam shaft will become operative to swing the shaft 95 and the parts carried thereby in the direction indicated by the arrow in Fig. 24 of the drawings until the fingers 93 reach their lowermost position. If, as assumed, there is no tobacco in either of the blending boxes, the adjusting screw 107 at the outer end of the leg 103 of the U-shaped member 102, carried by the shaft 95, comes into contact with the tail 108 of the pawl 109, thus moving said pawl out of engagement with the ratchet wheel 110, as shown in Fig. 16 of the drawings. This causes the feeding mechanism to be put in operation, as hereinbefore described, the upper run of the belts 26, 26a moving forwardly and carrying the tobacco which has been placed upon said belts by the feeding operator under the plates 32 and star wheels 37. The rear ends of the plates 32 all terminate in the same plane transversely of the machine, so that if the feeding operator has not placed the filler tobacco accurately upon the belts perpendicular to the side edges thereof, any tobacco which may be lying obliquely on the belts will contact with said rear ends of the plates and will be straightened out by the forward travel of the belts to lie exactly perpendicular to said side edges. The forward travel of the belts will then carry the tobacco under the plates to the star wheels 37. The rotation of the star wheels, in cooperation with the forward travel of the belts, carries the tobacco forwardly and delivers it to the zone of movement of the rakes 39, the plates 32 confining the thickness of the layer of tobacco to substantially the same dimension as what may be termed the "vertical" height of the receptacles 91 of the blending boxes.

The feed actuating mechanism clutch, comprising the ratchet wheels 110 and 113 and the pawl-carrying arm 114, having been put in engagement by the oscillation of the shaft 95, the rakes 39 are also now operating, and as the tobacco is carried forwardly by the action of the star wheels and belts, the rakes 39 reciprocate repeatedly to engage the tobacco and push it forwardly across the shelf 38.

Just before the rakes 39 move to their lower position and while the fingers 93 are moving downwardly, cams 155 and 148 become operative to swing the rakes 140 from the position shown in Fig. 6 to the position shown in Fig. 7. As the rakes 39 begin their forward movement, cam 248 causes the knives 240 to be raised from the position shown in Fig. 6 to the position in Fig. 10, thereby moving said knives out of the path of the tobacco and permitting it to be pushed by the rakes 39 into the open rear ends of the blending boxes. Let it be assumed that when this occurs, the blending box 65 is in alignment with the belt 26a and will receive a charge of blend filler. As this charging of the blend filler to one of the boxes really marks the starting point of a complete cycle of the operation of the blending boxes, the charge of main filler which would simultaneously be fed into the blending box 64 can, for the time being, be left out of consideration. As the rakes 39 push the tobacco forwardly into the blending box 65, as indicated in Fig. 10 of the drawings, and against the lower end of the fingers 93, said fingers will be swung rearwardly by the pressure of the tobacco, the pin 100 moving within the slot 99 of the arm 98 secured to the oscillating shaft 95, and as the pin 100 connects the fingers 93 with the U-shaped member 102 to cause these two parts to move in unison; the leg 103 of the U-shaped member is swung upwardly a sufficient amount to permit the pawl 109 to again engage with the ratchet wheel 110 as soon as the proper amount of tobacco is fed into the blending box 65. The amount of tobacco which will be fed into the box is predetermined by the lowermost position of the fingers 93 as regulated by the adjustment of the screw 107. The engagement of the pawl 109 with the ratchet wheel 110 checks the feed of the belt 26a. After the predetermined amount of tobacco is fed into the blending box, the fingers 93 are again raised to their upper position and the knives 240 are actuated to cut or shear through what may be termed the streams of tobacco passing into the blending boxes. Just after the knives 240 are lowered, the rakes 140 are moved downwardly and rearwardly to engage behind the tobacco in the blending box and pull it forwardly therein.

Considering, for the time being, the operation which occurs in the blending box 65 only, now assumed to be in line with the belt 26a, the pins 300 carried at the upper end of the arm 302 (Figs. 11 and 13) are now in position to close the forward end of said blending box, as shown in full line in Fig. 13. As the rakes 140 move forwardly, the blend filler is merely squeezed between the rakes and the pins 300 and is moved forwardly in the box a sufficient distance to clear the pins 65a. The rakes 140 are then raised out of the blending box 65 and cam 90 becomes operative to swing the box 65 from the position shown in Fig. 7 of the drawings to that shown in Fig. 8 thereof, the pins 65a preventing the blend filler from dropping out of the box. Cam 85 now becomes operative to move the boxes transversely of the machine, the box 65 travelling across the machine in its upper position and carrying the charge of blend filler across with it. Box 65 is then lowered and brought to rest in alignment with the belt 26, the box 64 travelling in a straight line across the machine and coming to rest in alignment with the belt 26a and occupying the position formerly occupied by the box 65. The operator places a binder leaf 200 on the belt 172 with its front part projecting across the ironer 196 and the treadle 161 is again depressed; the belts 26, 26a and the other feeding instrumentalities which cooperate therewith again start their movements, as above described, and a charge of main filler is then fed into the box 65 now containing a charge of blend filler. The knives 240 and rakes 140 are actuated again in the manner just described.

Considering, now, the operation which occurs at the left-hand side of the machine in connection with the blending box in alignment with the belt 26; as the rakes 140 at this side of the machine move forwardly, they pull the mixed charge of blend and main filler into the transfer box 162, as indicated in Fig.

7 of the drawings. As the rakes 140 move upwardly, the transfer box 162 is swung by the action of the cam 167 from the position shown in Fig. 7 and as indicated in Fig. 8, to the position shown in Fig. 9. Shortly before the transfer box reaches the position shown in Fig. 9, the trip 169 engages with the table 171 and moves the plate 168 from its position, closing the end of the transfer box as shown in Fig. 8, to the position shown in Fig. 9. As the transfer box moves to the position shown in Fig. 9, it presses the apron 172 down into the slot 170 of the apron-carrying table 171. As this occurs, cam 190 operates to move the roller 186 from the position shown in Fig. 7 to that shown in Fig. 9, thereby releasing the tension on the apron 172 and permitting it to be thrust in a re-entrant bend or loop into the slot 170, the front edge of the box engaging the binder leaf 200 placed on top of the apron and drawing the leaf rearwardly across the ironer 196 and downwardly into the said re-entrant bend. Cam 212 now becomes operative to cause the plunger 204 to eject the charge of tobacco from the transfer box into the re-entrant bend or loop formed in the apron, and to thrust the binder and charge of mixed filler well down into said bend. The plunger 204 and transfer box 162 are then withdrawn, the plunger moving to its upper position and the transfer box 162 returning to its upper position in alignment with the blending box at the left-hand side of the machine. During the time the plunger and transfer box are moving upwardly, the frame 176 is actuated by means of the cam 183 and their connected parts to swing the frame forwardly and cause the apron 172 to roll the filler and binder into the desired bunched shape, in accordance with the usual operation of such rolling belts or aprons as employed in cigar bunching machines. When the frame 176 reaches the extreme forward limit of its travel, the bunched cigar will be released and permit it to drop into the shelf or receptacle 193 at the forward end of the apron table.

It will be understood that during the time the blending box at the right-hand side of the machine is receiving a charge of blend filler, the blending box at the left-hand side will be receiving a charge of main filler, and that the operation of the machine will proceed continuously, the operator, in the ordinary operation of the machine, placing a binder leaf 200 upon the apron 172 each time said operator depresses the treadle 161. Figs. 6 to 10, inclusive, of the drawings indicate the sequence of operations, the parts at the beginning of a cycle being shown in Fig. 6, with the blending box 64 at the left-hand side of the machine in alignment with the basic filler belt 26. From the preceding description it will be understood that the blending box 65 is at the right-hand side of the machine and has received a charge of blend filler at this time. Fig. 7 shows the parts just as the transfer box is about to begin its downward movement and the blending boxes about to begin their transverse movement. Fig. 8 shows the parts in positions corresponding to the mid positions of movement of the transfer and blending boxes, Fig. 9 the charge being delivered from the transfer box to the apron with the blending box 65 in position at the left-hand side of the machine before the belt 26, and Fig. 10 the position of the parts shortly after the next cycle of operations has begun.

It will be understood that although the machine is particularly adapted and designed for the automatic performance of a cigar bunching operation in which a blended cigar is to be manufactured, the machine is not limited in its use to the manufacture of blend filler cigars, but can be employed equally as well when a straight filler cigar is to be made. In the latter case, it will be obvious that instead of placing two different brands of filler tobacco upon the belt 26, 26a, a single brand would be used.

It will also be understood that either belt 26 or 26a may be employed for the main or blend filler.

From the foregoing description it will be noted that as the clutch actuating mechanisms for each belt are independent of each other, the belts will be operated independently in accordance with the amount of tobacco fed to each blending box; for example, as a smaller amount of blend filler is commonly used for each cigar, the belt 26a and associated parts feeding such filler would ordinarily operate for a shorter time in any one complete cycle of the machine than the belt 26 and its parts. The amount of each brand of filler used for each cigar can be very accurately measured by and controlled by the combined adjustment of weights 105, 106 and the screw 107, the former regulating primarily the amount of compression of the filler and the latter the thickness thereof. This double adjustment feature together with the gradual building-up of the charge secured by the repeated short reciprocations of the rakes 39 enables the machine to produce a loosely packed cigar of as good "burn" as can be made by hand, the building-up machine operation being practically identical to the hand method except that the machine operates more accurately. Owing to the looser packing, the cigar bunch when rolled will be free of the objectionable corners or sharp edges. In addition, blended cigars of greater uniformity can be manufactured by the use of my machine than can be made even by hand.

Due to the inclination of the knives 262 at the rear end of the machine, when the operator at said end cuts the end of a bunch of filler leaves, a saw-tooth edge will be formed on each leaf because of the rolled state thereof, thus providing a smaller amount of tobacco towards the end and enabling the taper at the ends of the bunched cigar to be formed more easily by the rolling apron. By changing the angular adjustment of the knives 262 provision can be made for different degrees of curvature or taper of the end portions of the cigars as desired.

The use of two separate belts has, in addition to the advantage of enabling the machine to be used for blended cigars, the very important advantage that the machine may also be used to make shaped cigars of the Perfecto or Invincible types. When such shaped cigars are to be made, the tobacco fed to one of the belts, as for example the belt 26a, would be cut in shorter lengths, as will be readily understood.

I claim:

1. In a machine for manufacturing cigars, two separate feeding mechanisms spaced from each other and adapted to feed two separate supplies of filler tobacco to the machine, a clutch for each of said mechanisms, and means operated by the tobacco fed to the machine for actuating each clutch automatically and independently of the other to stop its respective feeding mechanisms when a predetermined amount of each supply of tobacco is fed thereby to the machine.

2. A machine as set forth in claim 1, in which the means operated automatically by the tobacco includes weighted members projecting into the path of movement of each supply of tobacco.

3. A machine as set forth in claim 1, in which the means operated automatically by the tobacco includes independently adjustable weights and members associated therewith projecting into the path of movement of each supply of tobacco whereby the predetermined amount of each supply of tobacco fed to the machine may be varied as desired.

4. In a cigar bunching machine, a feeding mechanism comprising a feed belt, upon which the filler tobacco is fed, and a cutting knife adjacent to said belt, adjustable to different inclined positions relatively to the side edges of said belt.

5. In a cigar bunching machine, a feeding mechanism comprising a feed belt, upon which the filler tobacco is fed, a cutting knife adjacent to said belt, adjustable to different inclined positions relatively to the side edges of said belt, a manually operable member for actuating said knife and connections between said knife and member, said connections including sliding members to permit said knife to be moved to various adjusted positions.

6. In a cigar bunching machine, a pair of separate feeding mechanisms for feeding two separate supplies of tobacco to said machine, and a device movable from a position adjacent to one of said mechanisms to a position adjacent to the other, to transfer a charge of one of said supplies to be mixed with a charge of the other supply.

7. In a cigar bunching machine, two separate feeding mechanisms for feeding two separate supplies of tobacco to the machine, a pair of devices for transferring a charge of one of said supplies to be mixed with a charge of the other supply, and means for moving said receptacles simultaneously to cause each to move alternately from a position adjacent to one of said feeding mechanisms to a position adjacent to the other.

8. In a cigar bunching machine, two separate feeding mechanisms, spaced from each other and adapted to feed two separate supplies of filler tobacco to the machine, each of said mechanisms comprising a feed mechanism actuating shaft, a plurality of feeding devices actuated thereby, and a clutch, and means actuated by the tobacco fed by each respective mechanism for operating said clutch.

9. In a cigar bunching machine, two separate feeding mechanisms, spaced from each other and adapted to feed two separate supplies of filler tobacco to the machine, each of said mechanisms comprising a feed mechanism actuating shaft, a plurality of feeding devices and intermittently actuated driving connections between said shaft and devices.

10. In a cigar bunching machine, two separate feeding mechanisms, spaced from each other and adapted to feed two separate supplies of filler tobacco to the machine, each of said mechanisms comprising a feed mechanism actuating shaft, a feed belt, a plurality of rotating feed members adjacent to and spaced from said belt and intermittently actuated driving connections between said shaft and said belt and rotating members.

11. In a cigar bunching machine, the combination of means for feeding two separate supplies of filler tobacco, a rake for separating a predetermined amount of tobacco from one of said supplies, a rake for separating a predetermined amount of tobacco from the other of said supplies to complete a predetermined mixed or blended charge of tobacco for the cigars to be made, a conveyor adapted to transfer one of said charges to the other charge, a transferrer to convey said combined charges to a rolling device and means for rolling said combined charge within a binder leaf.

12. A cigar bunching machine as set forth in claim 11, in which the mechanism for feeding the filler tobacco comprises a reciprocating member and means to cause said member to perform a plurality of strokes while said cycle of operations is being performed by the other mechanisms.

13. A cigar bunching machine as set forth in claim 11, in which the mechanism for feeding the filler tobacco comprises a reciprocating member, means to cause said member to perform a plurality of strokes while said cycle of operations is being performed by the other mechanisms, and means operated by the tobacco fed to the machine for stopping the operation of the feeding mechanism without interrupting the cycle when a predetermined amount or charge of tobacco has been fed past a certain point of said machine.

14. In a cigar bunching machine, a pair of feed mechanisms for feeding two separate supplies of tobacco to the machine, a pair of receptacles normally adapted to occupy positions adjacent to said mechanisms to receive tobacco therefrom and means to move said receptacles in unison to cause their positions to be transposed.

15. In a cigar bunching machine, a pair of spaced feed mechanisms for feeding two separate supplies of tobacco to the machine, a rolling mechanism for rolling a charge of filler in a binder leaf, a transfer device movable from a position adjacent to said rolling device to a position adjacent to one of said feeding mechanisms, and a receptacle movable from a position adjacent to one of said feed mechanisms to a position adjacent to the other and between said other and said transfer device.

16. In a cigar bunching machine, a pair of spaced feed mechanisms for feeding two separate supplies of filler tobacco to the machine, a pair of receptacles adapted to occupy positions adjacent to said mechanisms to receive filler tobacco therefrom, means to move said receptacles in unison and alternately from one of said feed mechanisms to the other, a rolling device for rolling the filler tobacco in a binder leaf and means adjacent to one of said feed mechanisms for transferring said filler tobacco from the receptacle adjacent thereto to said rolling device.

17. A cigar bunching machine as set forth in claim 16, in which means are associated with said receptacles for holding the filler tobacco therein until the receptacles are brought into cooperative relationship with the transferring means.

18. In a cigar bunching machine, a pair of feed mechanisms for feeding two separate supplies of filler tobacco to the machine, a receptacle movable from a position adjacent to one of said feed mechanisms to a position adjacent to the other for receiving a charge of tobacco from each of said mechanisms, and means cooperatively associated with each of said feed mechanisms and adapted to project into said receptacle when the latter is in position adjacent to each respective feed mechanism for stopping each feed mechanism when a predetermined charge of tobacco is fed thereby into said receptacle.

19. In a cigar bunching machine, a pair of spaced feed mechanisms for feeding two separate supplies of filler tobacco to the machine, a pair of receptacles adapted to occupy positions adjacent to said mechanisms to receive filler tobacco therefrom, means to move said receptacles in unison and alternately from one of said feed mechanisms to the other, a rolling device for rolling the filler tobacco in a binder leaf, means adjacent to one of said feed mechanisms for transferring said filler tobacco from the receptacle adjacent thereto to said rolling device, and means adjacent to each of said feed mechanisms and cooperatively associated therewith for stopping each respective feed mechanism independently of the other when a predetermined charge of filler tobacco has been fed thereby into the receptacle then adjacent such feed mechanism.

20. In a cigar bunching machine, a pair of spaced feed mechanisms for feeding two separate supplies of filler tobacco to the machine, a pair of receptacles adapted to occupy positions adjacent to said mechanisms to receive filler tobacco therefrom, means to move said receptacles in unison and alternately from one of said feed mechanisms to the other, a rolling device for rolling the filler tobacco in a binder leaf, means adjacent to one of said feed mechanisms for transferring said filler tobacco from the receptacle adjacent thereto to said rolling device, and reciprocating means located adjacent to each feed mechanism for cooperation therewith and with said receptacles for carrying a charge of filler tobacco from each respective feed mechanism into the cooperatively located receptacle, and separate actuating devices for said last named means to impart strokes of different amplitude thereto and cause the tobacco fed into the receptacle adjacent said transferring means to be carried thereinto while the charge carried into the other receptacle is held therein.

21. In a machine for manufacturing cigars, two separate feeding mechanisms spaced from each other, for feeding in two separate and distinct paths two separate supplies of filler tobacco to the machine, a receptacle movable from a position in alignment with one of said mechanisms to a position in alignment with the other for transferring a portion of one supply of filler tobacco into the path of movement of the other supply, means for rolling the filler tobacco into a binder, and a receptacle for transferring the filler tobacco to said rolling means.

22. In a machine for manufacturing cigars, two separate feeding mechanisms spaced from each other, for feeding in two separate and distinct paths two separate supplies of filler tobacco to the machine, a receptacle movable from a position in alignment with one of said mechanisms to a position in alignment with the other for transferring a portion of one supply of filler tobacco into the path of movement of the other supply, means for rolling the filler tobacco into a binder, and mechanism cooperatively associated with said receptacle for transferring a charge of filler tobacco to said rolling means.

23. In a cigar bunching machine, a feed mechanism for feeding a supply of filler tobacco, a rolling device for rolling a charge of said filler in a binder leaf, a receptacle movable from a position adjacent to the delivery end of said feeding mechanism to transfer said charge to said rolling device, driving means for said receptacle and feed mechanism and controlling means co-operatively associated with said feed mechanism and adapted to project into said receptacle, when the latter is in position adjacent to said feed mechanism, for stopping said feed mechanism when a predetermined charge of tobacco is fed thereby into said receptacle.

24. In a cigar bunching machine, a feed mechanism comprising a feed belt upon which the filler tobacco is fed, a cutting knife for severing a charge of tobacco from the stream thereof fed by said belt, a rolling device for rolling a charge of said filler in a binder leaf, a receptacle movable to and from a position adjacent to the delivery end of said feeding mechanism for transferring said charge to said rolling device, said feeding mechanism including two sets of reciprocating members, one located in advance of said knife and the other located in the rear thereof, for building up a charge of filler tobacco in said receptacle in a succession of relatively small increments, and controlling means co-operatively associated with said feeding mechanism and adapted to project into said receptacle when the latter is in a position adjacent to said feeding mechanism for stopping said feeding mechanism when a predetermined charge of tobacco is fed thereby into said receptacle.

25. In the process of making cigar bunches the steps which consist of arranging tobacco leaves, without previous flattening thereof, in sequence in a substantially continuous path and crosswise of the length of said path, advancing the tobacco along said path, selecting a plurality of small amounts of leaves from the forward end of said path, adding additional quantities of tobacco leaves to the opposite end of said path, assembling said selected small amounts of tobacco, applying pressure to the selected small amounts of tobacco after the later selected small amounts have been assembled with the first selected portion, transferring said assembled tobacco leaves to a binder en masse without substantially shifting the leaves from their assembled relation, and rolling said leaves into said binder.

In testimony whereof I have hereunto set my hand.

WALTER H. SCHUSSLER.